United States Patent
Soejima

(10) Patent No.: US 8,766,077 B2
(45) Date of Patent: Jul. 1, 2014

(54) MUSIC PLAYING MOVEMENT DISPLAY CONTROL DEVICE, MUSIC PLAYING MOVEMENT CONTROL METHOD AND COMPUTER READABLE MEDIUM

(71) Applicant: Casio Computer Co., Ltd., Tokyo (JP)

(72) Inventor: Junichiro Soejima, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/758,287

(22) Filed: Feb. 4, 2013

(65) Prior Publication Data

US 2013/0199357 A1     Aug. 8, 2013

(30) Foreign Application Priority Data

Feb. 6, 2012  (JP) ................................. 2012-023405
Feb. 6, 2012  (JP) ................................. 2012-023406

(51) Int. Cl.
    *G09B 15/00*   (2006.01)
(52) U.S. Cl.
    USPC ...................................... 84/477 R; 84/470 R
(58) Field of Classification Search
    USPC .............................................. 84/470 R, 477 R
    See application file for complete search history.

(56) References Cited

U.S. PATENT DOCUMENTS

| | | | | |
|---|---|---|---|---|
| 3,978,756 A | * | 9/1976 | Feldman | 84/470 R |
| 5,392,682 A | * | 2/1995 | McCartney-Hoy | 84/470 R |
| 5,690,496 A | * | 11/1997 | Kennedy | 434/307 R |
| 5,841,051 A | * | 11/1998 | Segan | 84/477 R |
| 6,037,534 A | * | 3/2000 | Yasutoshi et al. | 84/477 R |
| 6,388,181 B2 | * | 5/2002 | Moe | 84/477 R |
| 6,388,182 B1 | * | 5/2002 | Bermudez | 84/477 R |
| 6,982,375 B2 | * | 1/2006 | McGregor | 84/478 |
| 7,220,907 B2 | * | 5/2007 | McIntosh | 84/477 R |
| 7,361,829 B2 | * | 4/2008 | Uehara | 84/746 |
| 7,378,585 B2 | * | 5/2008 | McGregor | 84/600 |
| 7,582,825 B2 | * | 9/2009 | Chien et al. | 84/724 |
| 7,674,965 B2 | * | 3/2010 | Mataele | 84/483.2 |
| 7,982,115 B2 | * | 7/2011 | Johnston | 84/483.2 |
| 8,008,563 B1 | * | 8/2011 | Hastings | 84/479 A |
| 8,338,684 B2 | * | 12/2012 | Pillhofer et al. | 84/470 R |
| 8,445,767 B2 | * | 5/2013 | Brow et al. | 84/609 |
| 2006/0137511 A1 | * | 6/2006 | McGregor | 84/478 |
| 2013/0068086 A1 | * | 3/2013 | Mittelstadt et al. | 84/645 |

(Continued)

FOREIGN PATENT DOCUMENTS

JP    3528051 A    3/2004

OTHER PUBLICATIONS

JP 3528051 translation document, translated Mar. 1, 2014, Japanese time viewed Feb. 28, 2014 US time.*

*Primary Examiner* — Robert W Horn
(74) *Attorney, Agent, or Firm* — Holtz Holtz Goodman & Chick PC

(57) ABSTRACT

A music playing movement display control device 1 includes CPU 11 that creates a time list including respective times and a time in advance of the respective times during a musical performance, based on music playing information. The CPU 11 draws on the display unit 16 a movement image of a finger showing a pressed key position on a keyboard at the respective times and a movement image of a finger showing a pressed key position on a keyboard at the times in advance to the respective times for each of the respective times during a musical performance, based on music playing information, movement information, keyboard data, structure data, and a time list.

18 Claims, 29 Drawing Sheets

(56) References Cited

U.S. PATENT DOCUMENTS

| | | | |
|---|---|---|---|
| 2013/0104724 A1* | 5/2013 | Soejima | 84/467 |
| 2013/0199357 A1* | 8/2013 | Soejima | 84/467 |
| 2013/0233152 A1* | 9/2013 | Pillhofer et al. | 84/470 R |

* cited by examiner

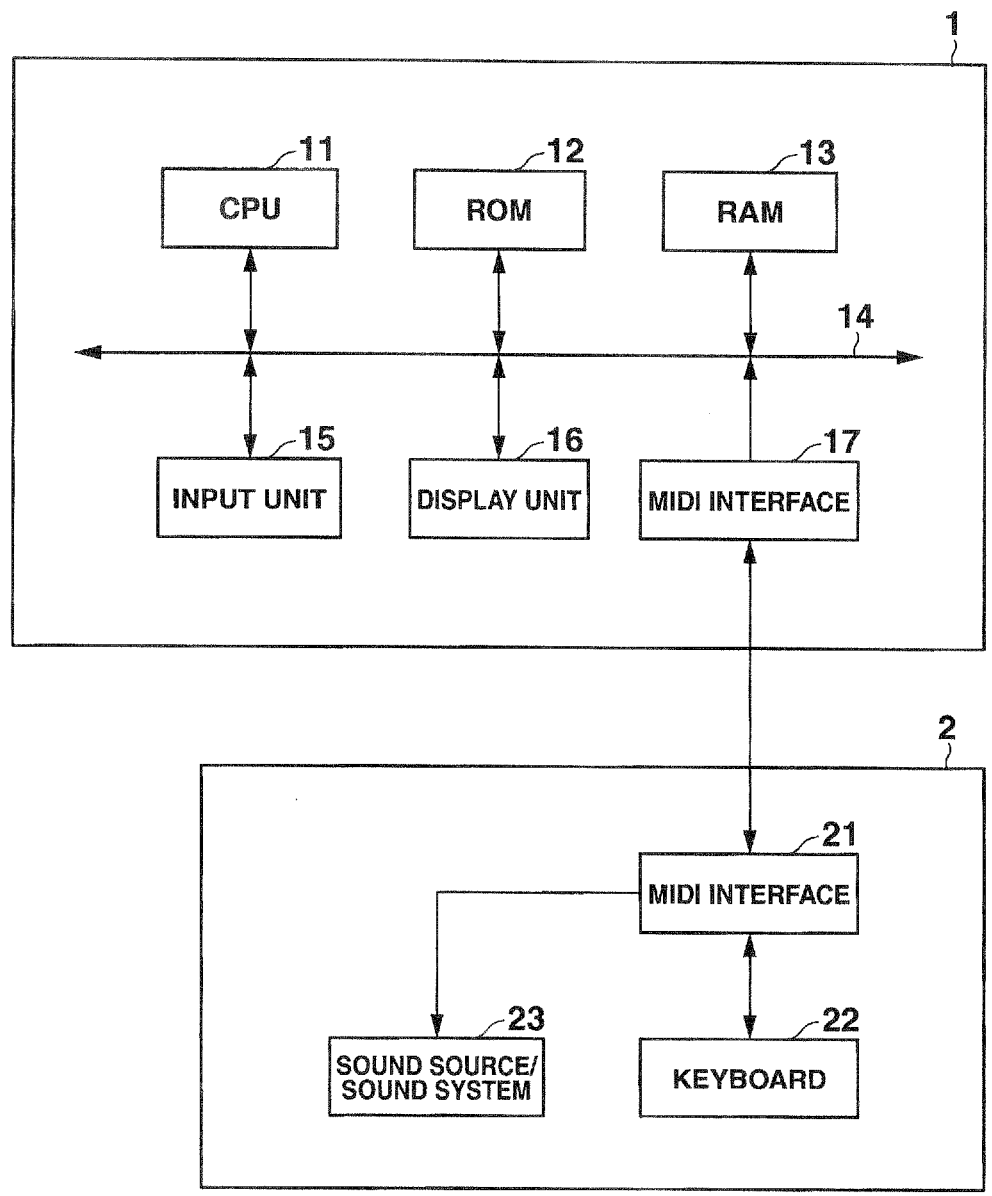

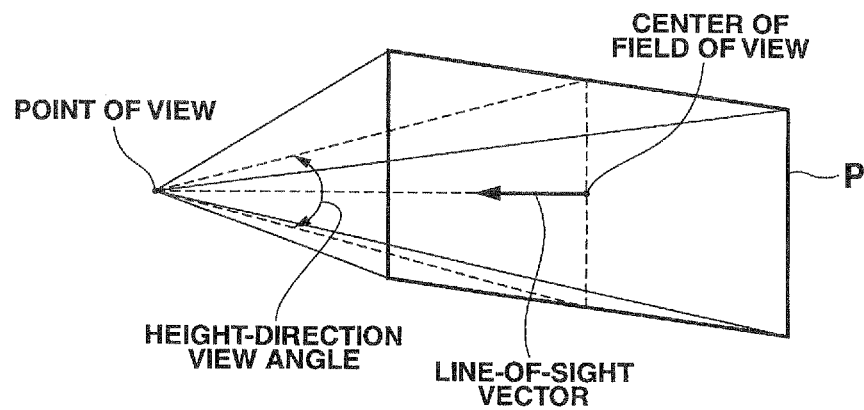

FIG.5

| | |
|---|---|
| Meas[0] | Time |
| | Gate |
| | BeatN |
| | BeatD |
| | BeatStep[BeatN] |
| Meas[1] | |
| | |
| | |
| | |
| | ... |
| | |
| Meas[N] | |
| | |
| | |
| | |
| | ... |
| | |

FIG.6

| | |
|---|---|
| Note[0] | Time |
| | Gate |
| | Pitch |
| | Finger |
| | FigTech[ ] |
| Note[1] | |
| | |
| | |
| | ... |
| | |
| Note[N] | |
| | |
| | |
| | ... |
| | |

FIG.26

| handCtrl | width |
| --- | --- |
| | height |
| | f0vy |
| | Time |
| | Status |
| | Center[3] |
| | Eye[3] |
| | Eyevector[3] |
| | NoteR[ ] |
| | StructR[ ] |
| | MotionR[ ] |
| | NoteL[ ] |
| | StructL[ ] |
| | MotionL[ ] |

MUSIC PLAYING MOVEMENT DISPLAY CONTROL DEVICE, MUSIC PLAYING MOVEMENT CONTROL METHOD AND COMPUTER READABLE MEDIUM

This application is based upon and claims the benefit of priority from the prior Japanese Patent Application No. 2012-23405, filed Feb. 6, 2012, and No. 2012-23406, filed Feb. 6, 2012, and the entire contents of which are incorporated herein by reference.

BACKGROUND OF THE INVENTION

Field of the Invention

The present invention relates to a music playing movement control device for displaying a music playing movement on an electronic musical instrument, and a method and a computer readable medium.

Thus far, a music playing movement display control device has been proposed which has a navigation function that notifies to a user of a finger to use for a keying operation on a key to be pressed (operated) according to the progression of a musical performance. For example, Japanese Patent No. 3528051 proposes a music playing movement display control device having a navigation function that notifies the user of a finger to use for a key operation by way of displaying, on a display unit, a position of a finger on the keyboard as a music playing movement while playing music. Furthermore, with the music playing movement display control device proposed in Japanese Patent No. 3528051, the matters of magnifying or reducing the display size of a finger, displaying a finger transparently, displaying a finger in a wire frame representation, changing a point of view (display angle), and the like in response to receiving a change operation for the display format of music playing movements fore ach part of the musical performance have been also proposed therein.

However, the music playing movement display control device of Japanese Patent No. 3528051 is configured to display on a display unit, at moments when sounds are generated, i.e. at a current time, the positions of fingers on a keyboard as music playing movement, and thus a player cannot confirm at the current time the music playing movement that should be performed subsequently. Therefore, the player of this music playing movement display control device cannot foresee a continuous music playing movements, and thus cannot efficiently practice how to move fingers continuously.

Furthermore, for the music playing movement display control device of Patent No. 3528051, in a case of confirming a music playing movement of a predetermined section during a musical performance, it is necessary for the player to play back the entire music and wait for the section or to set a start point and an end point of the section. Specifically, in a case of the player setting a start point and an end point of the section, it is necessary to perform a minor adjustment of the section in order to set a passage of music to play precisely, a result of which setting operations have become complicated. For this reason, the player often cannot practice a local section efficiently.

SUMMARY OF THE INVENTION

The present invention addresses such problems and has object of providing a music playing movement display control device that allows the display of a music playing movement by which a player can easily practice, a music playing movement display control method, and a computer readable medium.

In order to achieve the abovementioned object, a music playing movement display control device according to an aspect of the present invention includes a drawing unit that, based on music playing information including data indicating a sound generation start time, a sound generation continuation time, a pitch, and fingers to be used for a musical performance, keyboard data storing a pressed key status of a keyboard based on the music playing information, structure data indicating a structure of fingers, and movement information for displaying the structure data corresponding to the sound generation start time, draws on a display a movement image of the fingers indicating a pressed key position on the keyboard at respective times during the musical performance.

Furthermore, a method according to an aspect of the present invention is a music playing movement display method performed by a music playing movement display control device including drawing, on a display, a movement image of fingers indicating a pressed key position on a keyboard at respective times during a musical performance. based on music playing information including data indicating a sound generation start time, a sound generation continuation time, a pitch, and the fingers to be used for the musical performance, keyboard data storing a pressed key status of the keyboard based on the music playing information, structure data indicating a structure of fingers, and movement information for displaying the structure data corresponding to the sound generation start time.

Moreover, a computer readable medium (a storage medium) according to an aspect of the present invention is a computer readable medium encoded with a software for enabling a computer to execute the steps of: drawing, on a display, a movement image of the fingers indicating a pressed key position on a keyboard at respective times during a musical performance, based on music playing information including data indicating a sound generation start time, a sound generation continuation time, a pitch, and fingers to be used for a musical performance, keyboard data storing a pressed key status of a keyboard based on the music playing information, structure data indicating a structure of fingers, and movement information for displaying the structure data corresponding to the sound generation start time.

BRIEF DESCRIPTION OF THE DRAWINGS

FIG. 1 is a block diagram showing a hardware configuration of a music playing movement display control device and an electronic instrument as a first embodiment according to one embodiment of the present invention;

FIG. 3 is a diagram providing explanations for each term used when performing music playing movement display on a display unit;

FIG. 4 is a diagram showing a structure of control variables;

FIG. 5 is a diagram showing a structure of musical measure information;

FIG. 6 is a diagram showing a structure of music playing information;

FIG. 26 is a diagram showing a structure of control variables in the music playing movement display control device of the fourth embodiment;

DETAILED DESCRIPTION OF THE PREPARED EMBODIMENT

Figure 2A:
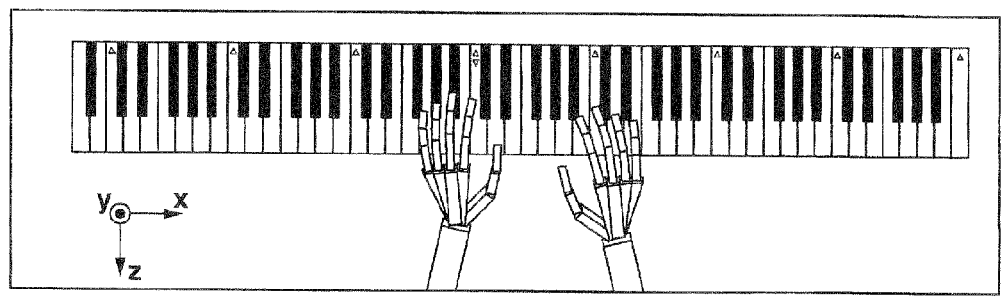
FIG. 2A is a diagram showing an example of a music playing movement display.

In the following, embodiments of the present invention are explained with reference to the drawings.

First Embodiment

FIG. 1 is a block diagram showing a hardware configuration of a music playing movement display control device and an electronic instrument as a first embodiment according to one embodiment of the present invention.

A music playing movement display control device 1 is provided with a display unit, for example.

The music playing movement display control device 1 is provided with a CPU (Central Processing Unit) 11, ROM (Read Only Memory) 12, RAM (Random Access Memory) 13, a bus 14, an input unit 15, a display unit 16, and a MIDI (Musical Instrument Digital Interface) interface 17.

The CPU 11 controls the overall music playing movement display control device 1 and executes various processing in accordance with programs stored in the ROM 12 or programs read from the ROM 12 into the RAM 13.

The ROM 12 stores processing programs for various processing executed by the CPU 11.

The RAM 13 stores programs and the like read from the ROM 12.

The bus 14 transmits various information outputted from each connected functional unit. The CPU 11, the ROM 12, the RAM 13, the input unit 15, display unit 16, and MIDI interface 17 are also connected to the bus 14.

In this way, the CPU 11, ROM 12, and RAM 13 are connected to each other via the bus 14.

The input unit 15 is configured with buttons and the like, for example, and receives the input of various information in accordance with an operational instruction from a user.

The display unit 16 displays information and the like relating to various setting information and music playing movements in accordance with the control by the CPU 11.

The MIDI interface 17 is connected to the electronic instrument 2. The MIDI interface 17 sends music playing data relating to a sample music performance and the like to the electronic instrument 2.

The electronic instrument 2 is provided with a MIDI interface 21, a keyboard 22, and a sound source/sound system 23.

The MIDI interface 21 is connected to the keyboard 22 and the sound source/sound system 23. The MIDI interface 21 receives music playing data relating to a sample music performance and the like from the music playing movement display control device 1, and outputs a music playing signal corresponding to this music playing data to the sound source/sound system 23. Furthermore, the MIDI interface 21 receives an operation input of an instrument from the keyboard 22 and outputs a music playing signal corresponding to this operation input to the sound source/sound system 23.

Such a music playing movement display control device 1 displays on the display unit 16 a sample movement of an arm, hand, and fingers while playing music, in order to aid in improving a user's music playing.

Figure 2B:
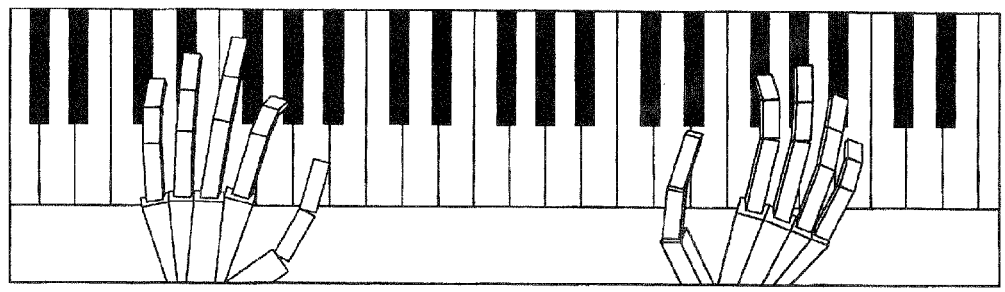
FIG. 2B is a diagram showing an example of a music playing movement display.
Figure 2C:
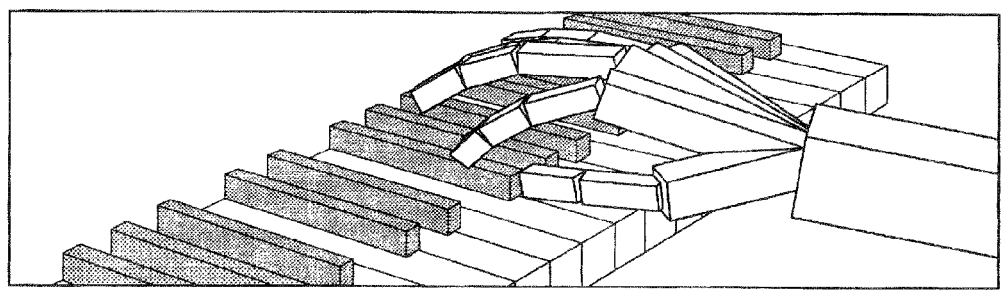
FIG. 2C is a diagram showing an example of a music playing movement display.

It should be noted that a display of the movement of an arm, hand, and fingers while playing music on the display unit 16 as shown in FIG. 2A is hereinafter referred to as normal music playing movement display. Furthermore, magnified display of the movement of an arm, hand, and fingers while playing music on the display unit 16 as shown in FIG. 2B is hereinafter referred to as magnified music playing movement display. Furthermore, the magnified display of an arm, hand, and fingers while playing music as shown in FIG. 2C from a diagonal direction is referred to as music playing technique display.

In addition, in the following explanation, a lateral direction in a case of visually observing the keyboard as shown in FIG. 2A from the front face (direction of keys from low pitch to high pitch) is an x-axis direction. Furthermore, an upwards direction in a case of visually observing the keyboard from the front face is a y-axis direction. In addition, a direction extending toward the keyboard from the front face in a case of visually observing the keyboard from the front face is a z-axis direction.

FIG. 3 is a diagram providing explanations for each term used when performing music playing movement display on the display unit 16.

First, an image displayed on the display unit 16 is a field of view P. A center position of this field of view P is referred to as a center of field of view. Then, a vector extending toward a point of view in a case of performing rendering from the center of the field of view is referred to as a line-of-sight vector. Furthermore, when drawing lines from an intermediate point on a lower end of the field of view and an intermediate point on an upper end of the field of view toward the point of view, respectively, the angle at which these lines intersect in the point of view is referred to as a height-direction view angle.

First, the information necessary for normal music playing movement display is explained. The information necessary for this music playing movement display is stored in the ROM 12. This information is copied as appropriate from the ROM 12 by the CPU 11 and temporarily stored in the RAM 13.

FIG. 4 is a diagram showing a structure of control variables. These control variables are used for performing normal music playing movement display and magnified music playing movement display in the music playing movement display control device 1.

For the control variables, width, height, f0vy, center[3], Eye[3], EyeVector[3], NoteR[ ], StructR[ ], MotionR[ ], NoteL[ ], StructL[ ], and MotionL[ ] are defined as variables.

In addition, in the diagram showing a structure, variables with [ ] at the end as a suffix suggest a sequence. For example, Center[3] is a sequence composed of three variables. Furthermore, in the diagram showing the structure, a sequence with the number of elements in the sequence blank indicates that the number thereof differs depending on the music to be played.

Herein, width is a variable representing the width of a screen displayed on the display unit 16.

Herein, height is a variable representing the height of a screen displayed on the display unit 16.

Herein, f0vy is a variable representing a height-direction view angle (please refer to FIG. 3).

Center[3] is a variable representing the center coordinates of a field of view on the screen displayed on the display unit 16. Center[3] includes each coordinate value in a three dimensional coordinate system (x, y, z) for each element and represents a position in the three dimensional coordinate system.

Eye[3] is a variable representing a coordinate of a point of view on the screen displayed on the display unit 16. Eye[3] represents a position in the three dimensional coordinate system, similarly to Center[3].

EyeVector[3] is a variable representing a line-of-sight vector. EyeVector[3] is obtained by subtracting Center[3] from Eye[3].

NoteR[ ] is a sequence variable in which music playing information by a right hand is stored. A detailed description thereof will be provided later.

StructR[ ] is a sequence variable in which structure data of a right hand is stored. The structure data is a diagram illustrating the structure of fingers, a hand, and an arm. StructR[ ] is used when rendering fingers, a hand, and an arm corresponding to a right hand on the screen displayed on the display unit 16.

MotionR[ ] is a sequence variable in which movement information representing a movement of a right hand while playing music is stored.

NoteL[ ] is a sequence variable in which music playing information by a left hand is stored.

StructL[ ] is a sequence variable in which structure data of a left hand is stored. StructL[ ] is used when rendering fingers, a hand, and an arm corresponding to a left hand on the screen displayed on the display unit 16.

MotionL[ ] is a sequence variable in which movement information representing the movement of a left hand during playing music is stored.

FIG. 5 is a diagram showing a structure of musical measure information. This musical measure information stores information relating to musical measures for playing music.

As shown in FIG. 5, each element in Meas[ ] (Meas [0], Meas [1], . . . Meas [N] . . . ) defines Time, Gate, BeatN, BeatD, and BeatStep[BeatN], respectively. It should be noted that, in the following explanation, sequence variables with different suffixes shall be defined as having the same variable unless otherwise stated. For example, in FIG. 5, Time, Gate, BeatN, BeatD, and BeatStep[BeatN] are defined only in Meas [0]; however, Time, Gate, BeatN, BeatD, and BeatStep [BeatN] shall also be defined similarly in the other variables (Meas[1], Meas[2], etc.).

Time is a variable representing a start time of a musical measure.

Gate is a variable representing a continuation time of a musical measure.

BeatN is a variable representing the numerator of a beat of a musical measure.

BeatD is a variable representing the denominator of a beat of a musical measure.

BeatStep[BeatN] is a variable representing the interval of a beat of a musical measure. BeatStep[BeatN] is a sequence variable provided with a number equal to the number of the value of BeatN.

FIG. 6 is a diagram showing the structure of music playing information.

As described above, the music playing information is configured from NoteR[ ] representing music playing information of a right hand and NoteL[ ] representing music playing information of a left hand.

Since NoteR[ ] and NoteL[ ] are the same in configuration, this Note[ ] and NoteL[ ] are collectively referred to as Note[ ] in FIG. 6.

As shown in FIG. 6, each element in Note[ ] (Note[0], Note[1], . . . Note[N] . . . ) defines Time, Gate, Pitch, Finger, and FigTech[ ], respectively.

Time is a variable representing a time when a sound starts (a sound generation start time).

Gate is a variable representing a time for which a sound continues.

Pitch is a variable representing a pitch of a sound generated (frequency).

Finger is a variable representing a finger number and corresponds to a thumb, an index finger, a middle finger, a ring finger, or a pinky finger.

FigTech[ ] is a sequence variable representing a music playing technique flag. For FigTech[ ], the number of elements equal to the number of the movement steps defined in the music playing technique is provided.

Figure 7:
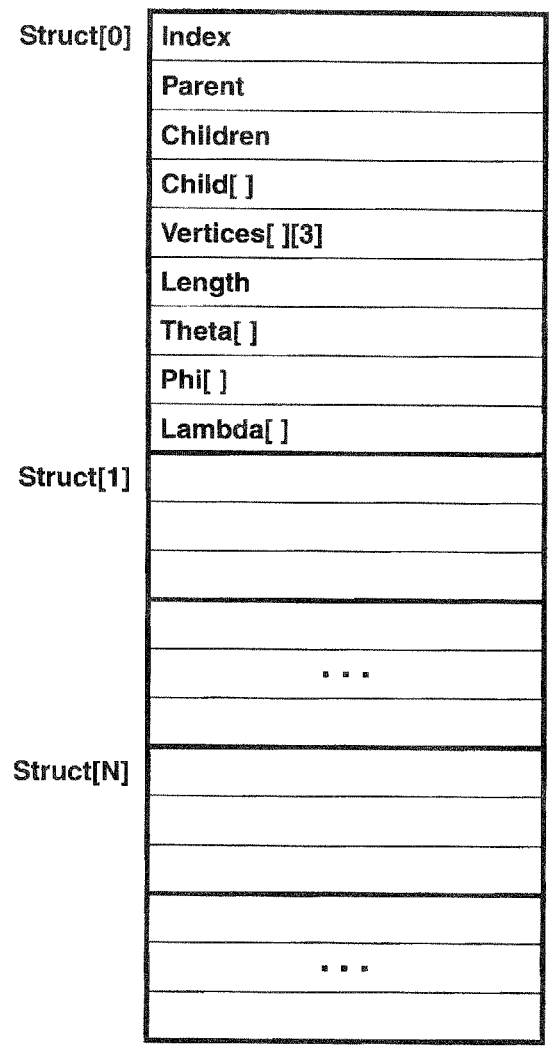
FIG. 7 is a diagram showing a structure of structure data.

FIG. 7 is a diagram showing a structure of structure data.

As described above, the structure data is configured from StructR[ ] representing structure data of a right hand and StructL[ ] representing structure data of a left hand.

Since StructR[ ] and StructL[ ] are the same in configuration, this StructR[ ] and StructL[ ] are collectively referred to as Struct[ ] in FIG. 7.

As shown in FIG. 7, each element in Struct[ ] defines Index, Parent, Children, Child[ ], Vertices[ ][3], Length, Theta[ ], Phi[ ], and Lambda[ ], respectively.

Index is a variable representing an index of the structure data.

Parent is a variable representing an index of the structure data serving as parent data. For example, when the value of Parent is 2, the structure data of which the index is 2 becomes parent data. In addition, it should be noted that, when the value of Parent is −1, it indicates that there is no parent data.

Children is a variable representing the number of structures of children with respect to a parent structure.

Vertices[ ][3] is a sequence variable representing a parent structure and the three-dimensional coordinates of each vertex of a polygon displayed on the display unit 16. [ ] of Vertices[ ][3] corresponds to the number of vertices of a polygon and the number of elements equal to the number of vertices is defined. Furthermore, [3] of Vertices[ ][3] corresponds to the three dimensional coordinates for each vertex in order to form a polygon.

Length is a variable representing a length of a parent structure.

Theta[ ] is a variable representing an x-axis rotation angle of a parent structure, and is the same number of elements as the number of elements of the movement information as described later is defined.

Phi[ ] is a variable representing a y-axis rotation angle of a parent structure, and the same number of elements as the number of elements of the movement information as described later is defined.

Lambda[ ] is a variable representing a z-axis rotation angle of a parent structure, and the same number of elements as the number of elements of the movement information as described later is defined.

Figure 8:
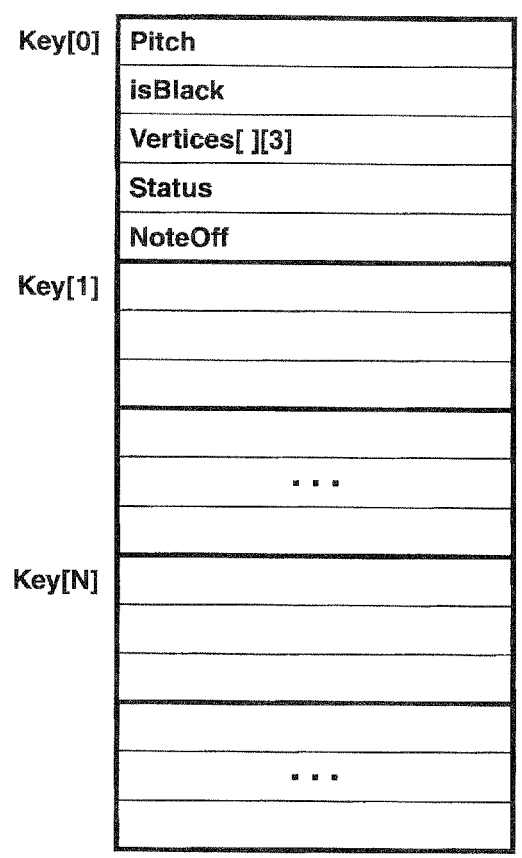
FIG. 8 is a diagram showing a structure of keyboard data.

FIG. 8 is a diagram showing a structure of keyboard data.

Key[ ] as keyboard data stores the respective information of white keys and black keys that constitute a keyboard displayed on the display unit 16. In Key[ ], information for each key in the order of key tone from the lowest is stored. For example, Key[0] corresponds to a white key located at a leftmost position, and Key[1] corresponds to a key of which the tone is higher than the white key by half tone.

As shown in FIG. 8, in each element in Key[ ], Pitch, is Black, Vertices[ ][3], Status, and NoteOff are defined.

Pitch is a variable representing the pitch of a sound to be generated (frequency).

is Black is a flag representing a white key or a black key. More specifically, is Black represents a white key when 0 and a black key when 1.

Vertices[ ][3] is a sequence variable representing structure data of a key (polygon data) and the three dimensional coordinates of each vertex of a polygon displayed on the display unit 16.

Status is a variable representing a status of a key. For example, Status represents a key releasing status when 0, represents a pressed key status (keying status) when +, and represents a released key status (key being released status) when −.

NoteOff is a variable representing a mute time, which is a time from a sound being generated until being muted.

Figure 9:
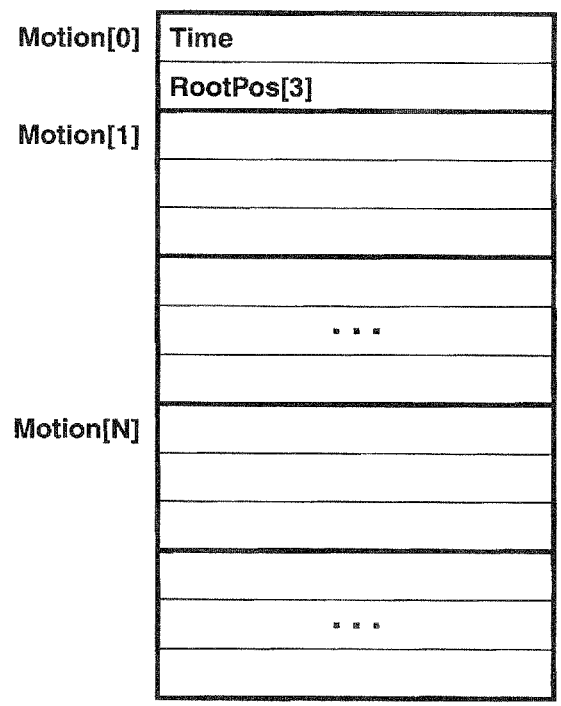
FIG. 9 is a diagram showing a structure of movement information.

FIG. 9 is a diagram showing the structure of movement information.

As described above, the movement information is configured from MotionR[ ] representing movement information of a right hand and MotionL[ ] representing movement information of a left hand.

Since MotionR[ ] and MotionL[ ] are the same in configuration, this MotionR[ ] and MotionL[ ] are collectively referred to as Motion[ ] in FIG. 9.

As shown in FIG. 9, Time and RootPos[3] are defined for each element in Motion[ ].

Time is a variable representing the time when each frame is started while playing music.

RootPos[3] is the three dimensional coordinates of a structure serving as a point of origin when drawing the structure on the display unit 16 (three dimensional coordinates of a joint point of origin).

A flow for the processing of music playing movement display is then explained.

Figure 10:
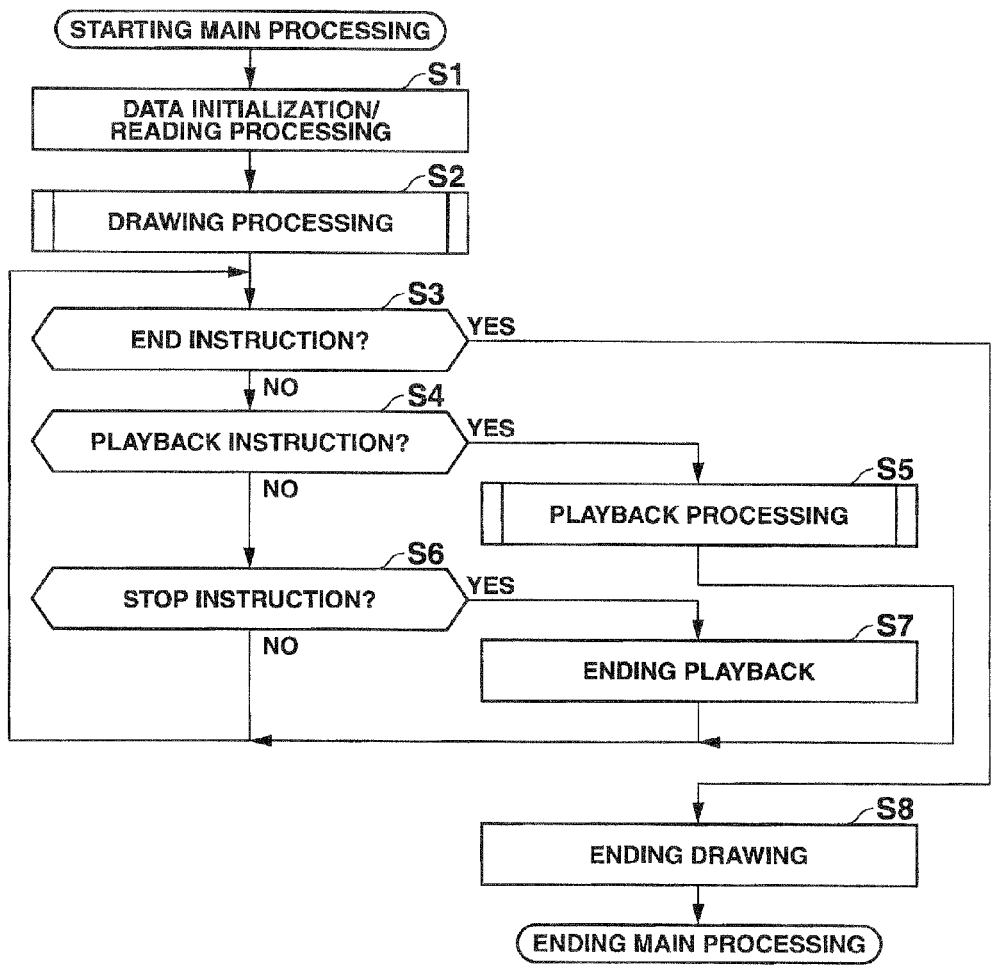
FIG. 10 is a flowchart showing a flow of main processing of music playing movement display.

FIG. 10 is a flowchart showing the flow of main processing of music playing movement display. This main processing is processing which is common in normal music playing movement display, magnified music playing video display, and music playing technique display.

In Step S1, the CPU 11 performs data initialization/reading processing.

That is to say, the CPU 11 performs initialization of data temporarily stored in the RAM 13, reads various information stored in the ROM 12, and then receives an instruction from a user via the input unit 15. The various information includes a control variable, music playing information, structure data, keyboard data, and movement information. The CPU 11 also stores a drawing end flag in the RAM 13 in the initialization of data. The initial value of the drawing end flag is set to OFF.

In Step S2, the CPU 11 performs drawing processing for performing drawing of a keyboard and the like on the display unit 16. The details of the drawing processing will be described with FIG. 14.

In Step S3, the CPU 11 determines whether it has received an end instruction from a user via the input unit 15. In the case of a Yes determination, the CPU 11 ends the main processing, and in the case of a No determination, the CPU 11 advances the processing to Step S4.

In Step S4, the CPU 11 determines whether it has received an instruction to play back music from a user via the input unit 15. In the case of a Yes determination, the CPU 11 advances the processing to Step S5, and in the case of a No determination, the CPU 11 advances the processing to Step S6.

In Step S5, the CPU 11 performs play back processing of music instructed by a user. The details of play back processing are described in detail with reference to FIG. 11. When the processing of Step S5 ends, the CPU 11 advances the processing to Step S3.

In Step S6, the CPU 11 determines whether it has received an instruction to stop playing back from a user via the input unit 15. In the case of a Yes determination, the CPU 11 advances the processing to Step S7, and in the case of a No determination, the CPU 11 advances the processing to Step S3.

In Step S7, the CPU 11 ends the play back of the music being played. When the processing of Step S7 ends, the CPU 11 advances the processing to Step S3.

In Step S8, the CPU 11 ends drawing on the display unit 16. More specifically, the CPU 11 sets the drawing end flag to ON.

Figure 11:
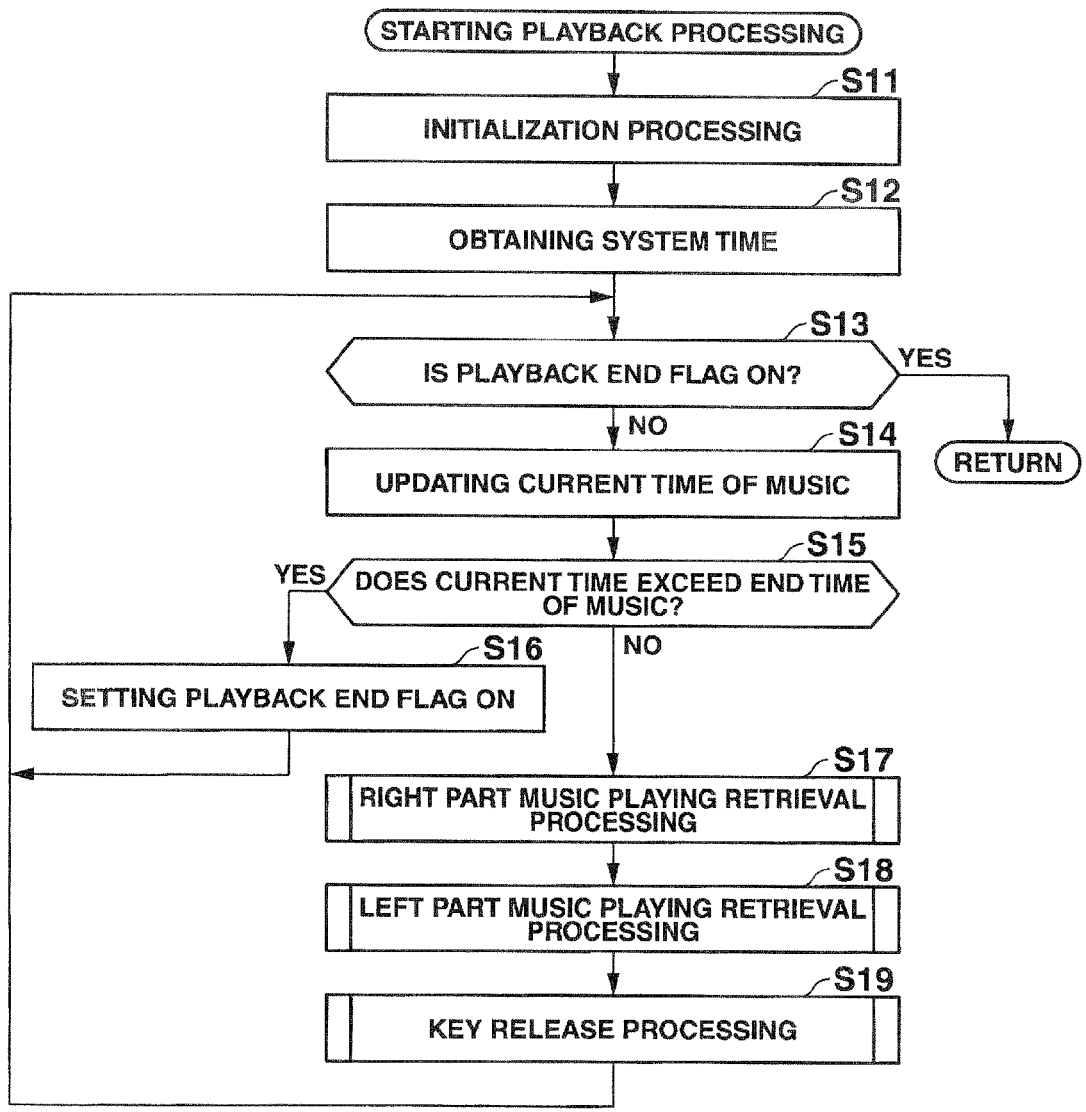
FIG. 11 is a flowchart showing a flow of play back processing.

FIG. 11 is a flowchart showing the flow of play back processing.

In Step S11, the CPU 11 performs initialization processing.

That is to say, the CPU 11 performs initialization of music playing information in response to the play back processing being started. The initialization of music playing information as used here means storing a control variable, keyboard data, music playing information, structure data, and movement information in the RAM 13. Here, the music playing information, structure data, and movement information are set to correspond to the music, which is instructed to be played back in main processing of FIG. 10. The CPU 11 also stores a play back end flag in the RAM 13 in the initialization processing. An initial value of the play back end flag is set to be OFF.

In Step S12, the CPU 11 obtains a system time from a timer (not illustrated).

In Step S13, the CPU 11 determines whether the status of the play back end flag stored in the RAM 13 is ON or OFF. The CPU 11 ends the playback processing when the play back end flag is ON. When the play back end flag is OFF, the CPU advances the processing to Step S14.

In Step S14, the CPU 11 updates a current time (playback position) of music being played back.

In Step S15, the CPU 11 determines whether the current time that is updated in Step S14 exceeds an end time of the music being played back. In the case of a YES determination, the CPU 11 advances the processing to Step S16, and in the case of a NO determination, the CPU 11 advances the processing to Step S17.

In Step S16, the CPU 11 updates the play back end flag stored in the RAM 13 to be ON. When the processing of Step S16 ends, the CPU 11 advances the processing to Step S13.

In Step S17, the CPU 11 performs right hand part music playing information retrieval processing, which is processing for retrieving music playing information of a right hand part. The details of the right hand part music playing information retrieval processing are described in detail with reference to FIG. 11.

In Step S18, the CPU 11 performs left hand part music playing information retrieval processing, which is processing for retrieving music playing information of a left hand part. The details of the left hand part music playing information retrieval processing are described in detail with reference to FIG. 11.

In Step S19, the CPU 11 performs key release check processing. The details of key releasing check processing are described in detail with reference to FIG. 13. When the processing of Step S19 ends, the CPU 11 advances the processing to Step S13.

Figure 12:
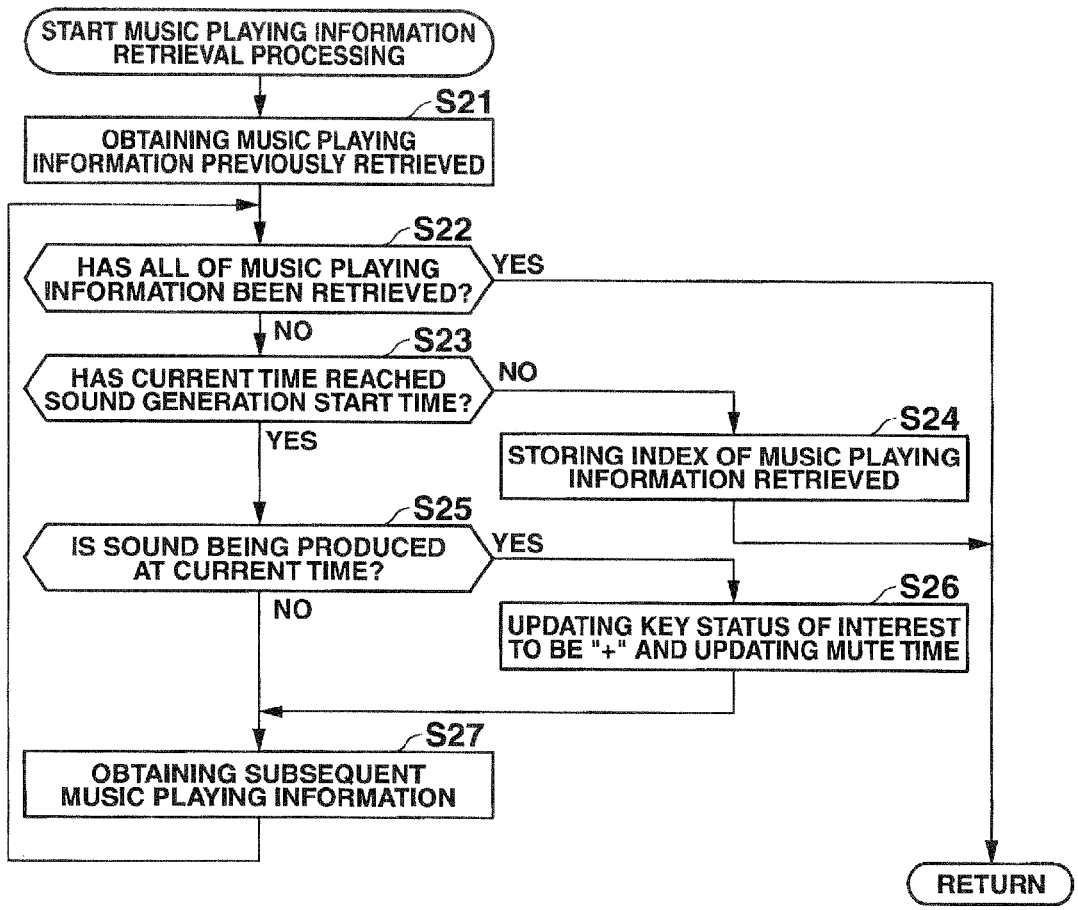
FIG. 12 is a flowchart showing a flow of music playing information retrieval processing.

FIG. 12 is a flowchart showing the flow of music playing information retrieval processing.

In addition, it should also be noted that Note[ ] described in this flowchart is replaced by NoteR[ ] in a case of performing right-hand-part movement information retrieval processing and is replaced by NoteL[ ] in a case of performing left-hand-part movement information retrieval processing.

In Step S21, the CPU 11 obtains, as music playing information to be drawn from the control variables (handCtrl) stored in the RAM 13, Note[ ], which was previously retrieved, by referencing an index (suffix) of the music playing information stored in the RAM 13. Furthermore, the CPU 11 obtains Note[0] in a case of obtaining the music playing information for the first time since the main processing was started.

In Step S22, the CPU 11 determines whether it has obtained all of the music playing information based on the drawing target music playing information index obtained in Step S21. That is to say, the CPU 11 determines whether the suffix of Note[ ] obtained in Step S21 is equal to a maximum value of the suffix of Note[ ]. In the case of a YES determination, the CPU 11 ends the music playing information retrieval processing, and in a case of a NO determination, the CPU 11 advances the processing to Step S23.

In Step S23, the CPU 11 determines whether the current time updated in Step S14 of FIG. 10 has passed the a sound generation start time of Note[ ]. In the case of a YES determination, the CPU 11 advances the processing to Step S25, and in the case of a NO determination, the CPU 11 advances the processing to Step S24.

In Step S24, the CPU 11 allows the RAM 13 to store the index (suffix) of the music playing information stored in the control variable (handCtrl) stored in the RAM 13.

In Step S25, the CPU 11 determines whether the sound was produced at the current time updated in Step S14 of FIG. 10. In the case of a YES determination, the CPU 11 advances the processing to Step S26, and in the case of a NO determination, the CPU 11 advances the processing to Step S27.

In Step S26, the CPU 11 updates the status of a corresponding key (Status) in the keyboard data (Key[ ]) stored in the RAM 13 to "+" (pressed key status) as well as updates a mute time (NoteOff) in the keyboard data. Here, the CPU 11 refers to Pitch of the music playing information stored in the control variable and specifies a key corresponding to the Pitch of Note[ ] obtained in Step S21.

In Step S27, the CPU 11 obtains subsequent music playing information. When the CPU 11 ends this processing, the CPU 11 advances the processing to Step S22.

Figure 13:
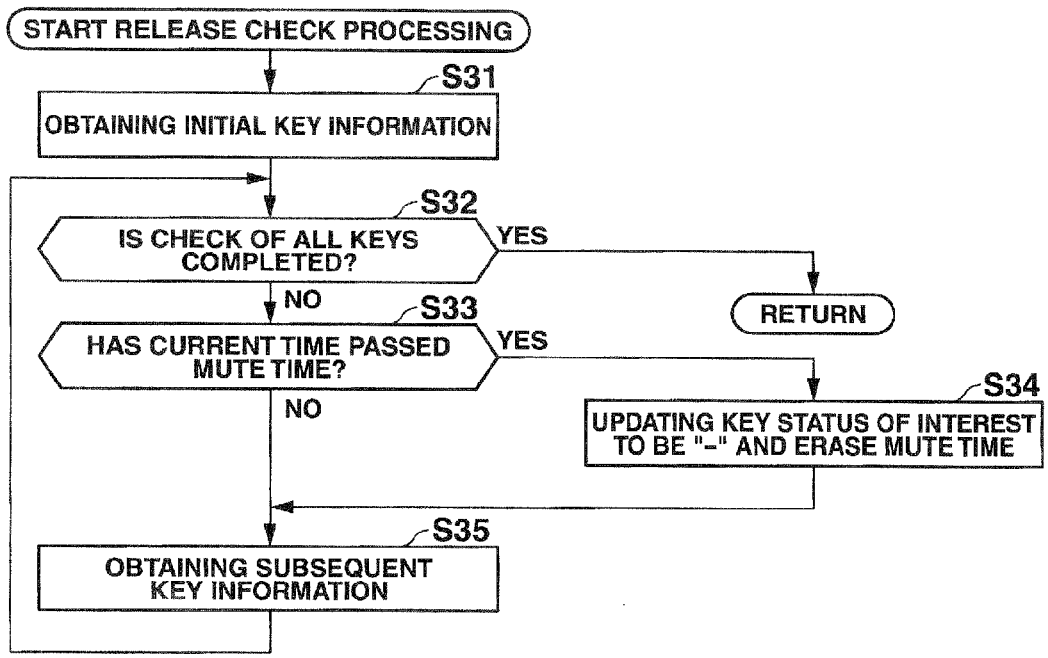
FIG. 13 is a flowchart showing key release check processing.

FIG. 13 is a flowchart showing key release check processing.

In Step S31, the CPU 11 obtains initial key information from the keyboard data (Key[ ]) stored in the RAM 13. Here, the initial key information refers to the lowest key information (Key[0]), for example.

In Step S32, the CPU 11 determines whether the checking of all of the key information has been completed. That is to say, the CPU 11 determines whether a suffix of Key[ ] is equal to the maximum suffix of Key[ ] stored in the ROM 12. In the case of a YES determination, the CPU 11 ends the key release check processing, and in the case of a NO determination, the CPU 11 advances the processing to Step S33.

In Step S33, in a case in which information indicating a mute time is stored in a mute time (Noteoff) included in the key information obtained in Step S31 or Step S35, the CPU 11 determines whether the current time updated in Step S14 of FIG. 11 has passed the time of performing the mute time. In the case of a YES determination, the CPU 11 advances the processing to Step S34, and in the case of a NO determination, the CPU 11 advances the processing to Step S35.

In Step S34, the CPU 11 updates the status of a corresponding key (Status) to "−" (a released key status) as well as erasing information stored in the mute time (NoteOff) in the keyboard data. When the processing of Step S34 ends, the CPU 11 advances the processing to Step S35.

In Step S35, the CPU 11 obtains subsequent key information. When the processing of Step S35 ends, the CPU 11 advances the processing to Step S32.

Figure 14:
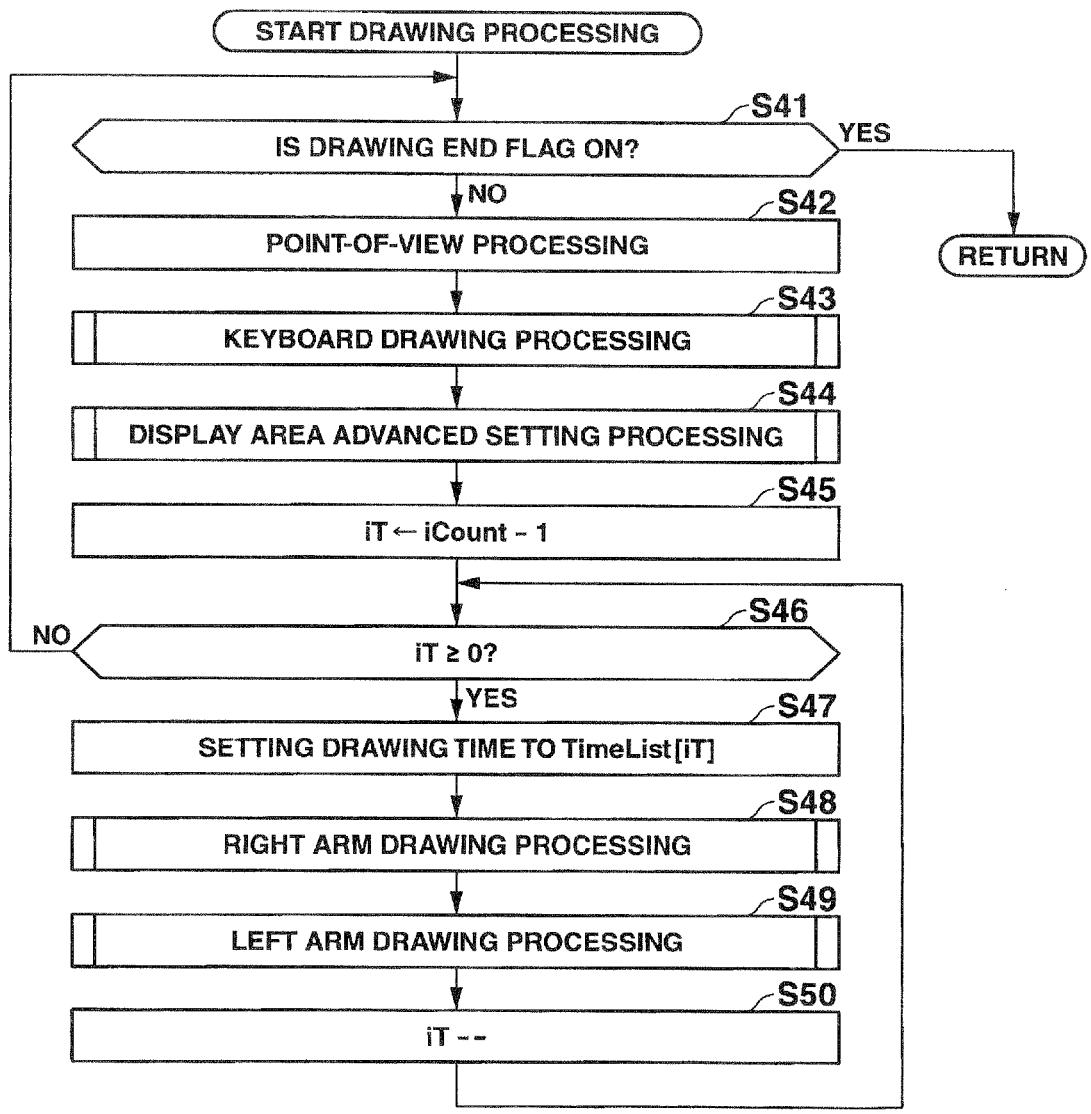
FIG. 14 is a flowchart showing a flow of drawing processing.

FIG. 14 is a flowchart showing the flow of drawing processing.

In Step S41, the CPU 11 determines whether a drawing end flag is ON. In a case of a YES determination, the CPU 11 ends the drawing processing, and in a case of NO determination, the CPU 11 advances the processing to Step S42.

In Step S42, the CPU 11 performs point-of-view setting processing. In addition, the CPU 11 can perform interrupt processing in response to receiving a predetermined operation by way of the input unit 15, and can perform point-ofview setting processing during playback of a musical performance. In this way, it is possible for the music playing movement display control device 1 to change a point-of-view during playback of a musical performance.

That is to say, the CPU 11 sets a point of view on a screen displayed on the display unit 16 based on a height-direction view angle (f0vy) stored in a control variable (handCtrl) stored in the RAM 13, a center coordinate of a view (Center [3]), and a point of view (Eye[3]). In Step S43, the CPU 11 performs keyboard drawing processing. The details of keyboard drawing processing are described in detail with reference to FIG. 15.

In Step S44, the CPU 11 performs display area advanced setting processing, which is processing for setting a display area in advance, and obtains an advanced displaying number iCount. The details of the display area advanced setting processing are described in FIG. 2.

In Step S45, the CPU 11 sets an index iT of the sequence variable TimeList to be an advanced displaying number iCount−1. The reason of setting the index iT by subtracting 1 (one) from the advanced displaying number in the present embodiment is because the minimum value of the index iT is zero. That is to say, any sequence variable may be set so long as the number of sequences of the sequence variable TimeList can maintain the advanced displaying number iCount.

In Step S46, the CPU 11 determines whether the condition of iT>=0 (iT is at least 0) is satisfied. In a case of a YES determination, the CPU 11 advances the processing to Step S47, and in the case of a NO determination, the CPU 11 advances the processing to Step S41.

In Step S47, the CPU 11 sets a drawing time to TimeList [iT].

In Step S48, the CPU 11 performs right arm drawing processing. The details of right arm drawing processing are described in detail with reference to FIG. 16.

In Step S49, the CPU 11 performs left arm drawing processing. The details of left arm drawing processing are described in detail with reference to FIG. 16.

In Step S50, the CPU 11 subtracts the indexiT. When this processing ends, the CPU 11 advances the processing to Step S46.

Figure 15:
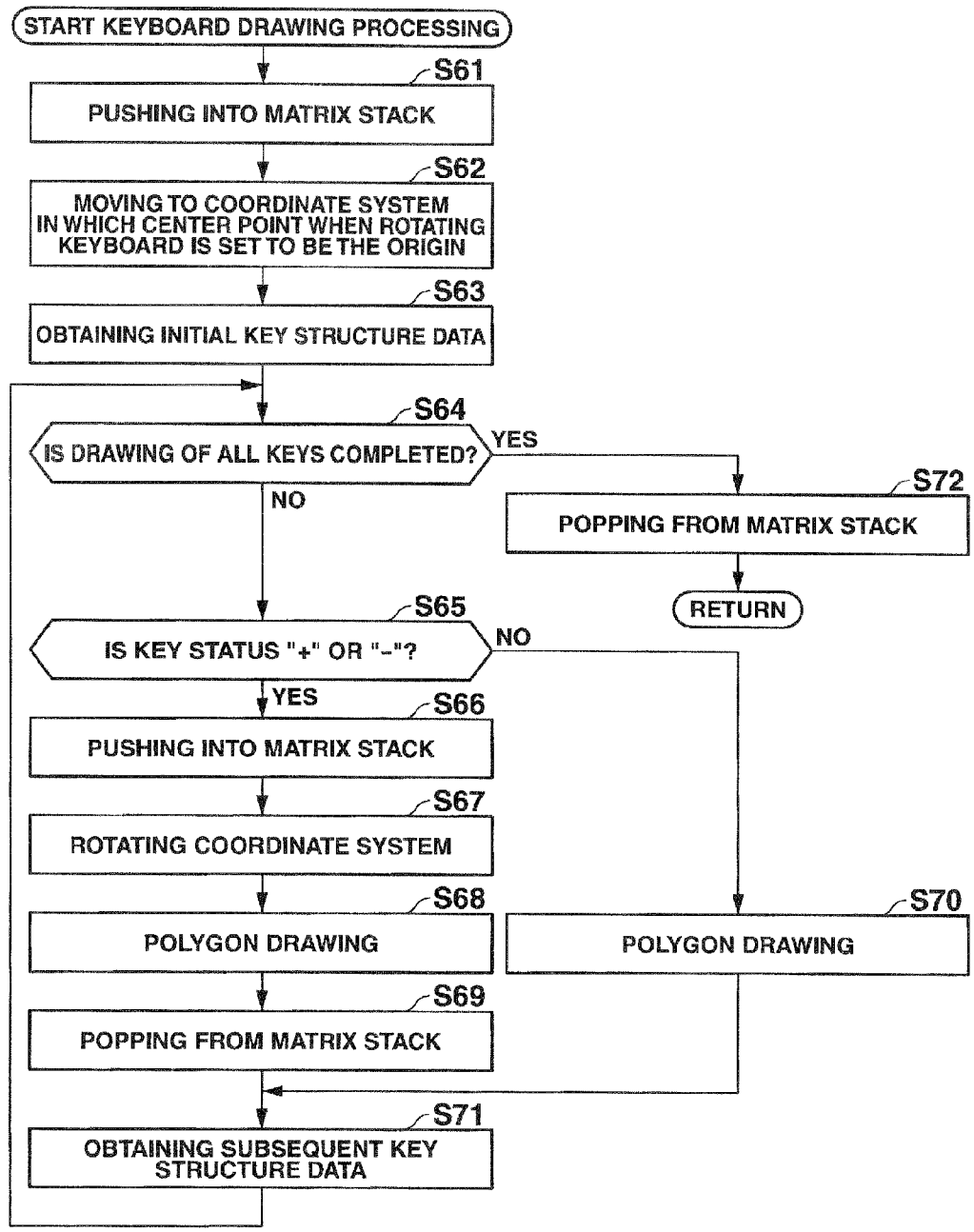
FIG. 15 is a flowchart showing a flow of keyboard drawing processing.

FIG. 15 is a flowchart showing the flow of the keyboard drawing processing.

In Step S61, the CPU 11 pushes structural data of keys into matrix stack in order to draw a keyboard. Here, the matrix stack refers to a data structure used for performing drawing of structural data.

In Step 62, the CPU 11 moves to a coordinate system in which a center point when rotating a keyboard is set to be the origin.

In Step S63, the CPU 11 obtains initial key structural data from the keyboard data (Key[ ]) stored in the RAM 13. Here, the initial key structural data refers to structural data (Vertices[ ][3]) corresponding to the lowest key information (Key [0]), for example.

In Step S64, the CPU 11 determines whether the drawing of all of the keys is completed. In the case of a YES determination, the CPU 11 advances the processing to Step S72, and in the case of a NO determination, the CPU 11 advances the processing to Step S65.

In Step S65, the CPU 11 determines whether the status of a key corresponding to the key structural data thus obtained is "+" (pressed key status) or "−" (released key status). In the case of a YES determination, the CPU 11 advances the processing to Step S66, and in the case of a NO determination, the CPU 11 advances the processing to Step S70.

In Step S66, the CPU 11 pushes the key structural data obtained in Step S63 or Step S71 into the matrix stack.

In Step S67, the CPU 11 rotates a coordinate system of the structural data that is pushed into the matrix stack in Step S66 by a predetermined angle. By being drawn with this status, the key status is displayed in such a way that a key in a "+" status (pressed key status) or a "−" status (released key status) is being keyed.

In Step S78, the CPU 11 performs polygon drawing of the key structural data that is pushed into the matrix stack.

In Step S69, the CPU 11 pops (clears) the key structural data that was pushed in Step S66.

In Step S70, the CPU 11 performs polygon drawing of the key structural data that was pushed into the matrix stack.

In Step S71, the CPU 11 obtains subsequent key structural data. It should be noted that, in a case in which the key structural data obtained immediately before is the final key (highest key), the CPU 11 maintains a state obtaining the key structural data thus obtained being obtained. When the processing of Step S71 ends, the CPU 11 advances the processing to Step S64.

In Step S72, the CPU 11 pops (clears) the key structural data that was pushed in Step S61.

Figure 16:
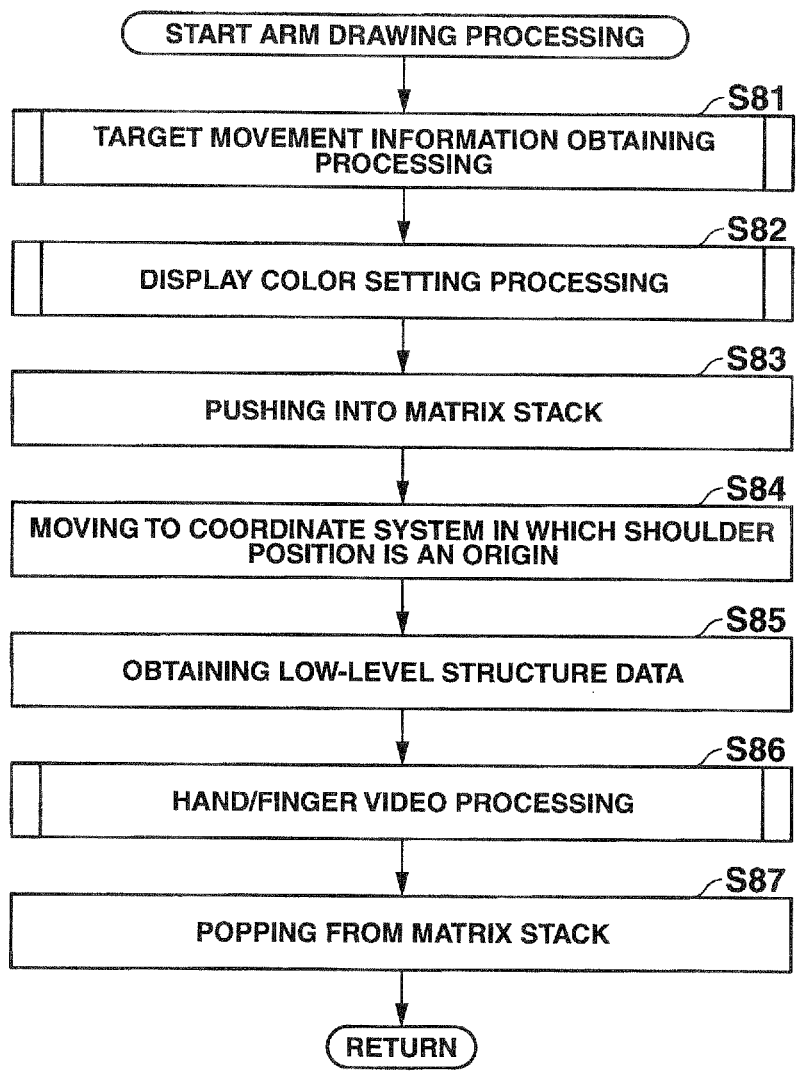
FIG. 16 is a flowchart showing a flow of arm drawing processing.

FIG. 16 is a flowchart showing the flow of arm drawing processing.

In Step S81, the CPU 11 performs target movement information obtaining processing that is processing for obtaining movement information that performs drawing. The details of the target movement information obtaining processing are described in FIG. 17.

In Step S82, the CPU 11 executes display color setting processing, which is processing for setting a display color for a hand, a finger, and an arm. The details of the display color setting processing will be described with FIG. 18.

In Step S83, the CPU 11 obtains, and pushes into the matrix stack, the structural data of the structure (right arm or left arm) that is set to be an origin obtained in Step S81.

In Step S84, the CPU 11 moves to the coordinate system in which a shoulder position is an origin in order to draw from the shoulder position.

In Step S85, the CPU 11 refers to Child[ ] of the structural data (Struct[ ]) stored in the RAM 13 and obtains low-level structural data. Here, the CPU 11 obtains structural data of a right hand or a left hand.

In Step S86, the CPU 11 performs hand/finger video processing. The details of hand/finger video processing are described in detail with reference to FIG. 19.

In Step S87, the CPU 11 pops the structural data of the structure (a right arm or a left arm) being pushed into the matrix stack.

Figure 17:
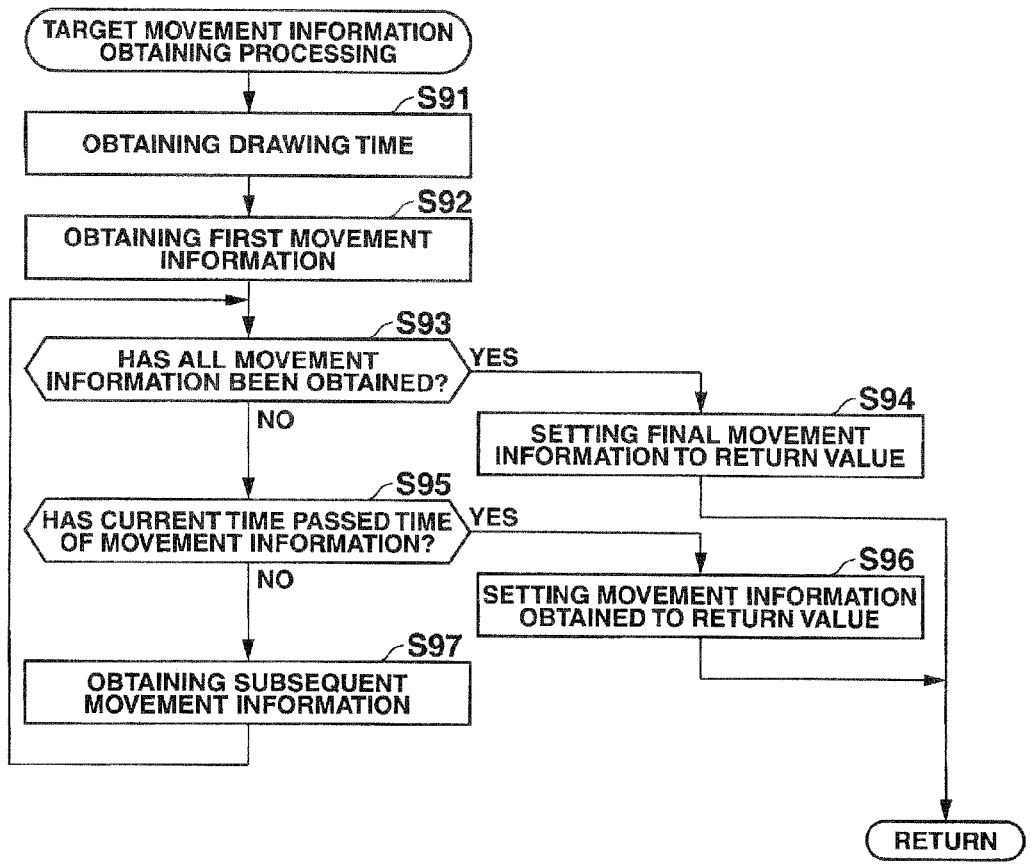
FIG. 17 is a flowchart showing a flow of target movement information obtaining processing.

FIG. 17 is a flowchart showing the flow of target movement information obtaining processing. In addition, it should be noted that Motion[ ] described in this flowchart is replaced by MotionR[ ] in a case of performing right arm drawing processing and is replaced by MotionL[ ] in a case of performing left arm drawing processing.

In Step S91, the CPU 11 obtains a drawing time.

In Step S92, the CPU 11 obtains drawing target movement information from the initial movement information (Motion[ ]) stored in the RAM 13. That is to say, the CPU 11 obtains the three dimensional coordinates of a structure that is set to be an origin when drawing the structure on the display unit 16, from RootPos[3] stored in Motion[ ].

In Step S93, the CPU 11 determines whether it obtained all of the movement information (Motion[ ]). In a case of a YES determination, the CPU 11 advances the processing to Step S94, and in a case of a NO determination, the CPU 11 advances the processing to Step S95.

In Step S94, the CPU 11 sets the final movement information to a return value of the target movement information processing. The final movement information is movement information for which a suffix (Motion[ ]) is the maximum. When the processing ends, the CPU 11 ends the target movement information obtaining processing.

In Step S95, the CPU 11 determines whether the current time updated in Step S14 of FIG. 11 has passed Time stored in the movement information (Motion[ ]). In a case of a YES determination, the CPU 11 advances the processing to Step S96, and in a case of a NO determination, the CPU 11 advances the processing to Step S97.

In Step S96, the CPU 11 sets movement information finally obtained to a return value of the target movement information obtaining processing. When the processing ends, the CPU 11 ends the target movement information processing.

In Step S97, the CPU 11 obtains subsequent movement information. In addition, in a case in which movement information obtained immediately before is movement information for which the suffix is the maximum, the CPU 11 maintains a state of the movement information thus obtained being obtained. When the processing of Step S97 ends, the CPU 11 advances the processing to Step S93.

Figure 18:
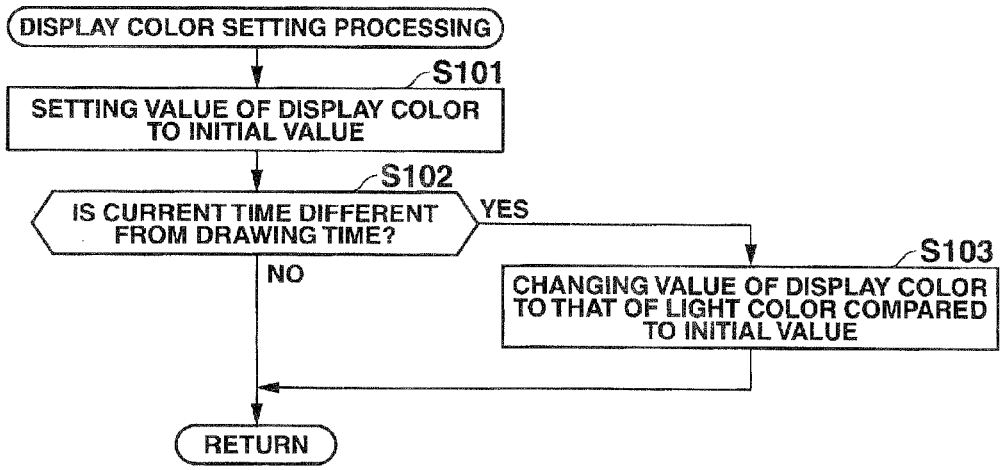
FIG. 18 is a flowchart showing a flow of display color setting processing.

FIG. 18 is a flowchart showing a flow of display color setting processing. In addition, it should be noted that Struct[ ] described in this flowchart is replaced by StructR[ ] in a case of performing finger drawing processing corresponding to the right hand and is replaced by StructL[ ] in a case of performing finger drawing processing corresponding to the left hand.

In Step S101, the CPU 11 sets a value of a display color of a finger to be an initial value. For example, the initial value is a value corresponding to skin color.

In Step S102, the CPU 11 determines whether a current time is different from a drawing time. In a case of a YES determination, the CPU 11 advances the processing to Step S103, and in a case of a NO determination, the processing ends the display color setting processing.

In Step S103, the CPU 11 changes a value of a display color to a value of a light color relative to the initial value. More specifically, the CPU 11 changes a display color in accordance with the formula (1) shown below.

Display Color=Display Color Before Change+(Most Advanced Display Color−Initial Value of Display Color)*{Offset Ratio+Variable Ratio*(Drawing Time−Current Time)/Maximum Advanced Interval}     (1)

That is to say, the CPU 11 calculates a value obtained by subtracting an initial value of a display color from a value of the most advanced display color based on the value calculated by dividing the difference between a drawing time and a current time by the maximum advanced interval. Then, the CPU 11 changes a value of a display color to a value of a light color relative to the initial value by adding the value thus obtained to a value of a display color prior to changing.

Figure 19:
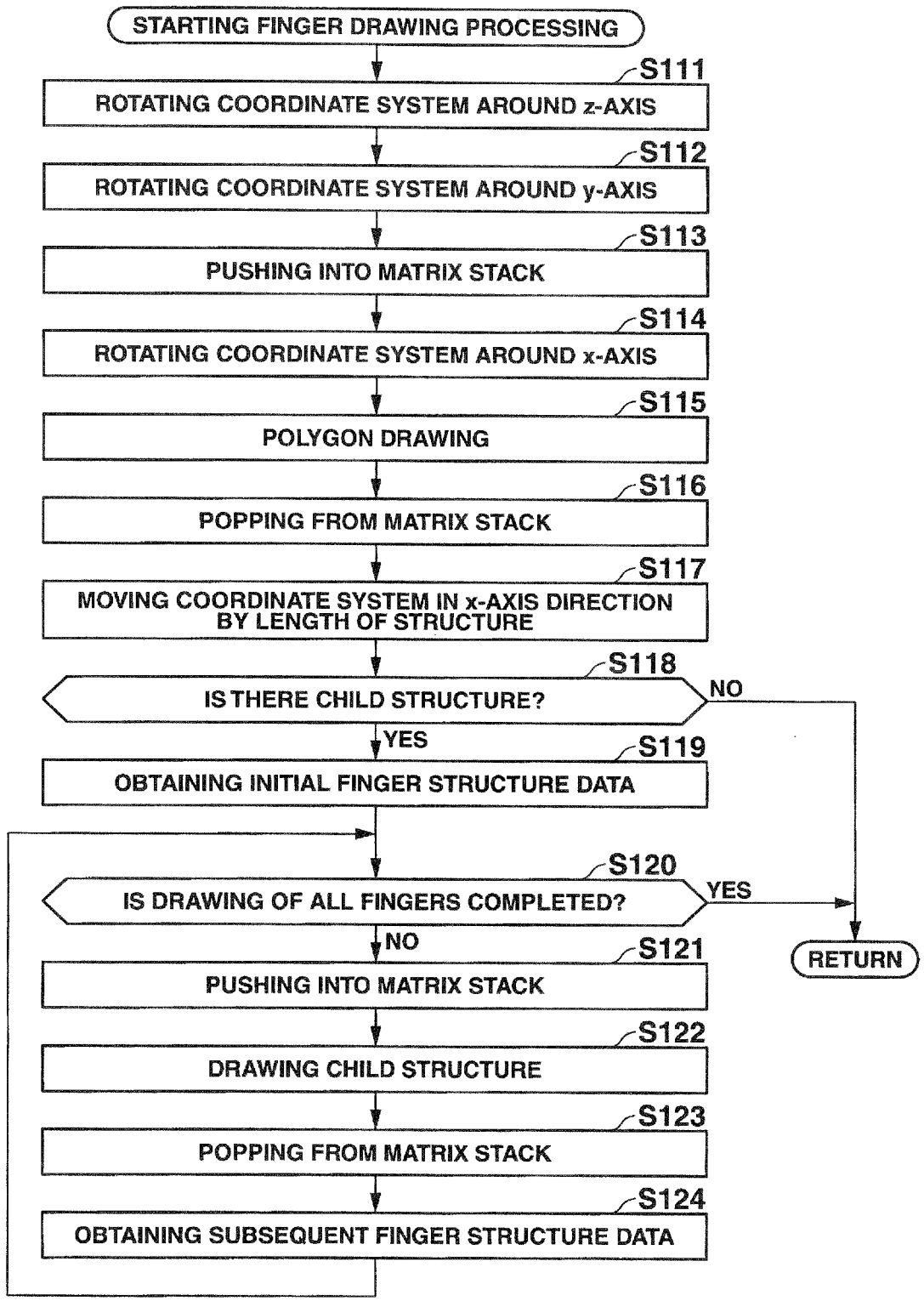
FIG. 19 is a flowchart showing a flow of finger drawing processing.

FIG. 19 is a flowchart showing a flow of finger drawing processing. In addition, it should be noted that Struct[ ] described in this flowchart is replaced by StructR[ ] in a case of performing finger drawing processing corresponding to the right hand and is replaced by StructL[ ] in a case of performing finger drawing processing corresponding to the left hand.

In Step S111, the CPU 11 obtains a value (z-axis rotation angle) of Lambda[ ] with reference to the structural data (Struct[ ]) stored in the RAM 13. Then, the CPU 11 rotates the drawing angle of the z-axis in the coordinate system based on the z-axis rotation angle thus obtained.

In Step S112, the CPU 11 obtains the value of Phi[ ] (the y-axis rotation angle) with reference to the structural data (Struct[ ]) stored in the RAM 13. Then, the CPU 11 rotates the drawing angle of the y-axis in the coordinate system based on the y-axis rotation angle thus obtained.

In Step S113, the CPU 11 pushes the hand structural data that was obtained in Step S85 of FIG. 16 into the matrix stack. Here, the CPU 11 multiplies the value of the arm structural data that is pushed to the matrix stack in Step S83 of FIG. 16 by the hand structural data, and then pushes the result of multiplication into the matrix stack. When the hand structural data is drawn in this state, the hand is drawn in a state connected with the arm.

In Step S114, the CPU 11 obtains the value of Theta[ ] (x-axis rotation angle) with reference to the structural data (Struct[ ]) stored in the RAM 13. Then, the CPU 11 rotates the x-axis drawing angle in the coordinate system based on the x-axis rotation angle thus obtained.

In Step S115, the CPU 11 performs polygon drawing of the hand structural data stored in the matrix stack. As described above, the hand is drawn in the state connected with the arm.

In Step S116, the CPU 11 pops the hand structural data from the matrix stack.

In Step S117, the CPU 11 obtains the value of Length from the structural data (Struct[ ]) stored in the RAM 13. Then, the CPU 11 moves the coordinate system in the x-axis direction by the length of the structure.

In Step S118, the CPU 11 determines if there is a child structure while referencing the value of Children of the structural data (Struct[ ]) stored in the RAM 13. Here, a child structure refers to a finger. In the case of a YES determination, the CPU 11 advances the processing to Step S119, and in the case of a NO determination, the CPU 11 ends the finger drawing processing.

In Step S119, the CPU 11 refers to the value of Child[ ] of the structural data (Struct[ ]) stored in the RAM 13, and obtains initial finger structural data. For example, when obtaining the finger structural data from a thumb to a little finger sequentially, the CPU 11 obtains the parent structure data of the thumb as initial finger structural data.

In Step S120, the CPU 11 determines whether drawing of all of the fingers is completed. In the case of a YES determination, the CPU 11 ends the finger drawing processing, and in the case of a NO determination, the CPU 11 advances the processing to Step S121.

In Step S121, the CPU 11 pushes the finger structural data obtained in Step S119 or Step S124 into the matrix stack. Here, the CPU 11 multiplies the value of the hand structural data by the finger structural data, and then pushes the result from the multiplication into the matrix stack. When the finger structural data is drawn in this state, the finger is drawn in the state connected with the hand.

In Step S122, the CPU 11 performs child structure drawing of the structural data that was pushed into the matrix stack in Step S121, i.e., drawing of finger structure data, for example.

In Step S123, the CPU 11 pops the structural data on which the child structure drawing was performed in Step S122 from the matrix stack.

In Step S124, the CPU 11 obtains subsequent finger structural data. For example, when the structural data of a thumb has been obtained immediately before, the CPU 11 obtains structural data corresponding to an index finger. In addition, for example, in a case in which structural data of the little finger was been obtained immediately before, the CPU 11 obtains structural data corresponding to a little finger again. When this processing ends, the CPU 11 advances the processing to Step S120.

Figure 20:
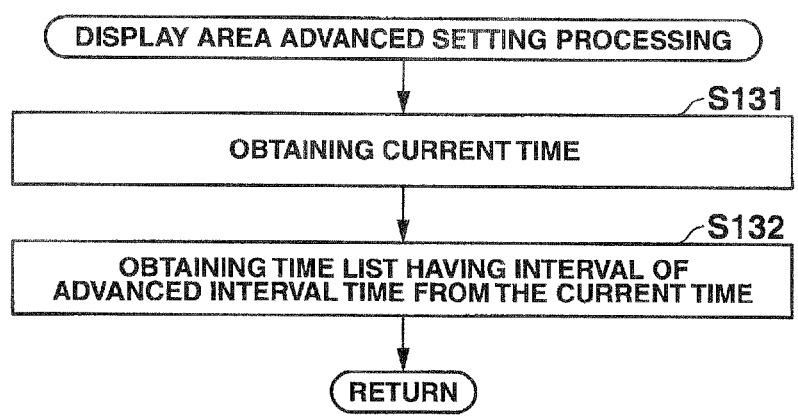
FIG. 20 is a flowchart showing a flow of display area advanced setting processing.

FIG. 20 is a flowchart showing a flow of the display area advanced setting processing.

Step S131, the CPU 11 obtains a current time.

In Step S132, the CPU 11 obtains a time list having intervals of the advanced interval time from the current time. More specifically, the CPU 11 sets an advanced time that is a time corresponding to a first object (finger) displayed in advance to the current time+the advanced interval time. Then, the CPU 11 sets the advanced time thus obtained to one variable that constitutes the sequence variable TimeList representing a time list (for example, TimeList[0]). Then, the CPU 11 sets the advanced time+the advanced interval time as an advanced time of an object that is more advanced that the first object. Then, the CPU 11 sets the advanced time thus obtained to one variable that constitutes the sequence variable TimeList (for example, TimeList[1]).

The CPU 11 thus obtains a time list having intervals of the advanced interval time from the current time, by setting the number of values of the sequence variable TimeList with the number of the advanced objects.

Figure 21:
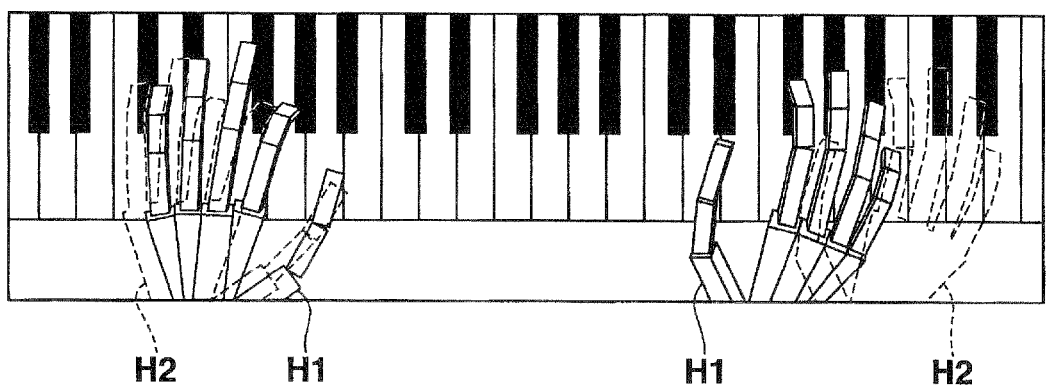
FIG. 21 is a diagram showing an example in which a finger is advance displayed.

FIG. 21 is a diagram showing an example in which a finger is advance displayed along with the music playing movement display of a finger corresponding to that at the current time. It should be noted that a finger (a pair of a right hand and a left hand) is displayed in advance in FIG. 21.

It can be confirmed in FIG. 21 that a finger H1 at the current time and a finger H2 that is advance displayed are displayed. It should be noted that the color of the finger H2 shown in FIG. 21 is a light color relative to the color of the finger H1.

As described above, in the first embodiment, the CPU 11 of the music playing movement display control device 1 creates a time list including respective times and a time in advance of the respective times for each of the respective times during a musical performance, based on the music playing information. Then, the CPU 11 draws on the display unit 16 a movement image of a finger showing a pressed key position on a keyboard at the respective times and a movement image of a finger showing a pressed key position on a keyboard at the times in advance to the respective times for each of the respective times during a musical performance, based on music playing information, movement information, keyboard data, structure data, and a time list.

In this way, the music playing movement display control device 1 displays the movement image of a finger at the time of the player playing along with the movement image of a finger at the time in advance to the time of the player playing, and thus enables the player to specifically imagine how to play music. Therefore, the music playing movement display control device 1 allows the display of a music playing movement by which a player can easily practice.

More specifically, in the music playing movement display control device 1, the CPU 11 changes a display mode of the movement image of a finger showing a pressed key position on the keyboard at the time in advance of the respective times during the musical performance with respect to the movement image of a finger showing the pressed key position on the keyboard at the respective times during the musical performance. Therefore, the music playing movement display control device 1 allows the player to identify the order of the advanced music playing information, enabling the player to specifically imagine how to move fingers during a musical performance.

Second Embodiment

A second embodiment is described hereafter.

A music playing movement display control device of the second embodiment is different from that of the first embodiment, and obtains a time list based on musical measure information.

Since the hardware configuration and the functional configuration of the music playing video display control device of the second embodiment are similar to those of the first embodiment and are as shown in FIG. 1, explanations thereof are omitted here.

Hereinafter, with reference to FIG. 22, only display area advanced setting processing that is performed by the music playing movement display control device of the second embodiment is explained.

Figure 22:
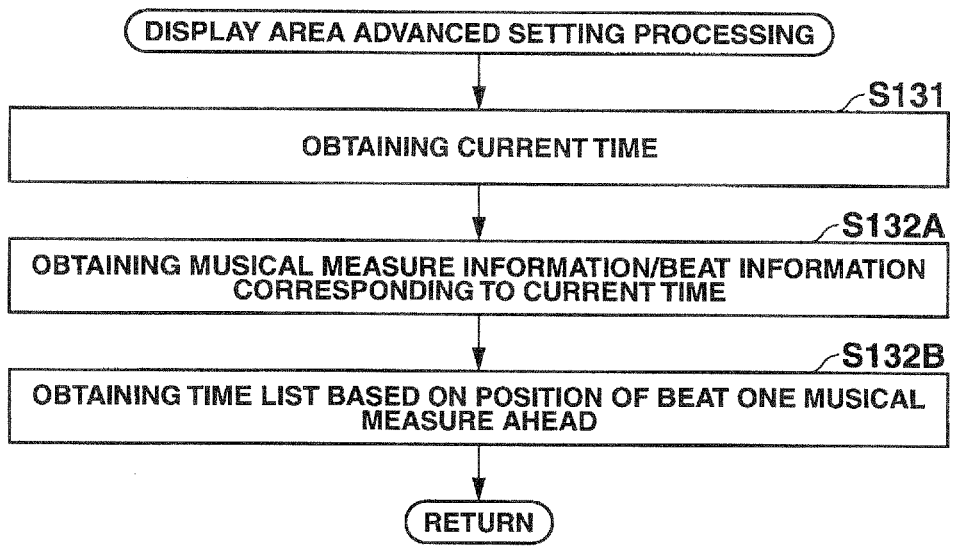
FIG. 22 is a flowchart showing a flow of display area advanced setting processing in the music playing movement display control device of the second embodiment.

FIG. 22 is a flowchart showing a flow of the display area advanced setting processing in the music playing movement display control device of the second embodiment.

In Step S131, the CPU 11 obtains a current time.

In Step S132A, the CPU 11 specifies a position of a beat from musical measure information corresponding to the current time. That is to say, the CPU 11 refers to a start time (Time) of the musical measure included in the musical measure information (Meas[ ]), and specifies musical measure information in which a start time of a musical measure corresponding to a time immediately before the current time obtained in Step S131 is stored. Then, the CPU 11 specifies a position of a beat which becomes the closest to the current time based on a continuation time of a musical measure (Gate) and an interval of a beat (BeatStep[BeatN]) in a musical measure in the musical measure information thus specified.

In Step S132B, the CPU 11 obtains a time list based on a position of a beat one musical measure ahead. For example, the CPU 11 sets a value of the sequence variable TimeList based on respective times corresponding to each of a plurality of beats present from the position of the beat specified in Step S132A to the position of the beat one musical measure ahead. In this way, the CPU 11 can obtain the time list corresponding to each beat present from the current time to the time one musical measure ahead of the current time.

As described above, in the second embodiment, the music playing movement display control device specifies a position of a beat from musical measure information corresponding to the current time and obtains a time list based on a position of a beat one musical measure ahead of the position of the beat. In this way, the music playing movement display control device of the second embodiment can always allow a player to confirm the movement of fingers from the current time to the time one musical measure ahead.

Third Embodiment

A third embodiment is described hereafter.

A music playing movement display control device of the third embodiment is different from the music playing movement display control device 1 of the first embodiment, and obtains a time list based on musical measure information to magnify a screen to be advance displayed for passages where music playing techniques are defined.

Since the hardware configuration and the functional configuration of the music playing video display control device of the third embodiment are similar to those of the first embodiment and are as shown in FIG. 1, explanations thereof are omitted here.

Hereinafter, display area advanced setting processing, drawing processing, and finger drawing processing performed by the music playing movement display control device of the third embodiment are explained.

Figure 23:
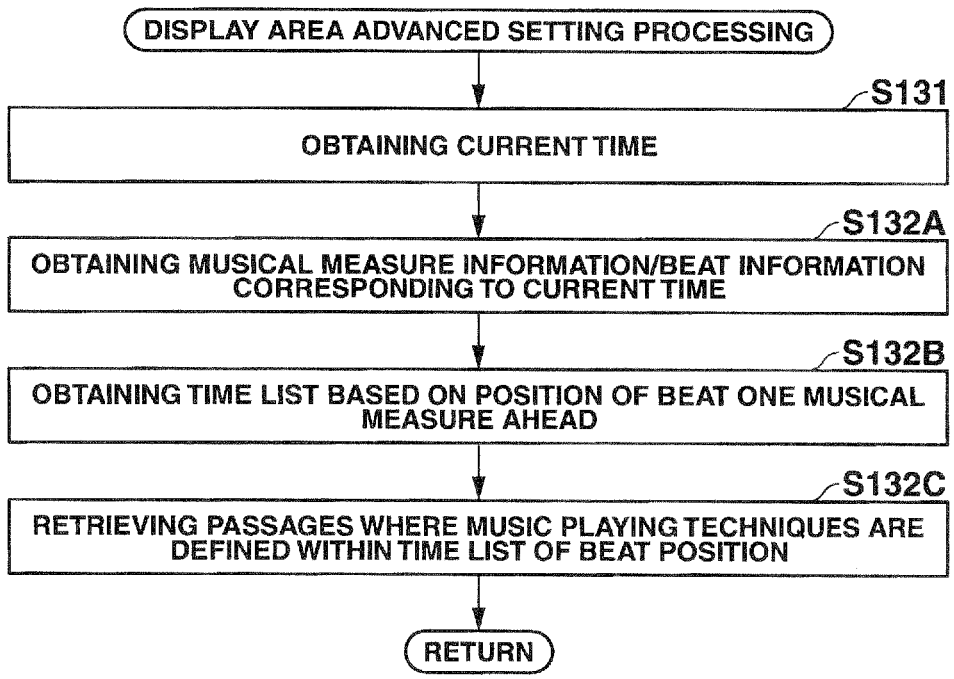
FIG. 23 is a flowchart showing a flow of display area advanced setting processing in the music playing movement display control device of the third embodiment.

FIG. 23 is a flowchart showing a flow of display area advanced setting processing in the music playing movement display control device of the third embodiment.

In Step S131, the CPU 11 obtains a current time.

In Step S132A, the CPU 11 specifies a position of a beat from musical measure information corresponding to the current time.

In Step S132B, the CPU 11 obtains a time list based on a position of a beat one musical measure ahead.

Since the processing of Step S132A and Step S132B are the same as the processing of Step S132A and Step S132B of the display area advanced setting processing of the second embodiment, detailed explanations are omitted.

In Step S132C, the CPU 11 creates a technique list (TechList[ ]) that is a sequence variable corresponding to the time list obtained in Step S132B. Then, the CPU 11 refers to the music playing information shown in FIG. 6 and specifies a sound generation start time (Time) corresponding to a time included in the time list obtained in Step S132B. Then, the CPU 11 stores a value of a music playing technique flag corresponding to this sound generation start time in a technique list. In this way, a value of a music playing technique flag corresponding to a time included in a time list is stored in a technique list that is associated with the time list.

For example, the CPU 11 sets a value of the sequence variable TimeList, based on respective times corresponding to each of a plurality of beats present from the position of the beat specified in Step S132A to the position of the beat one musical measure ahead. In this way, the CPU 11 can obtain the time list corresponding to each beat present from the current time to the time one musical measure ahead of the current time.

Figure 24:
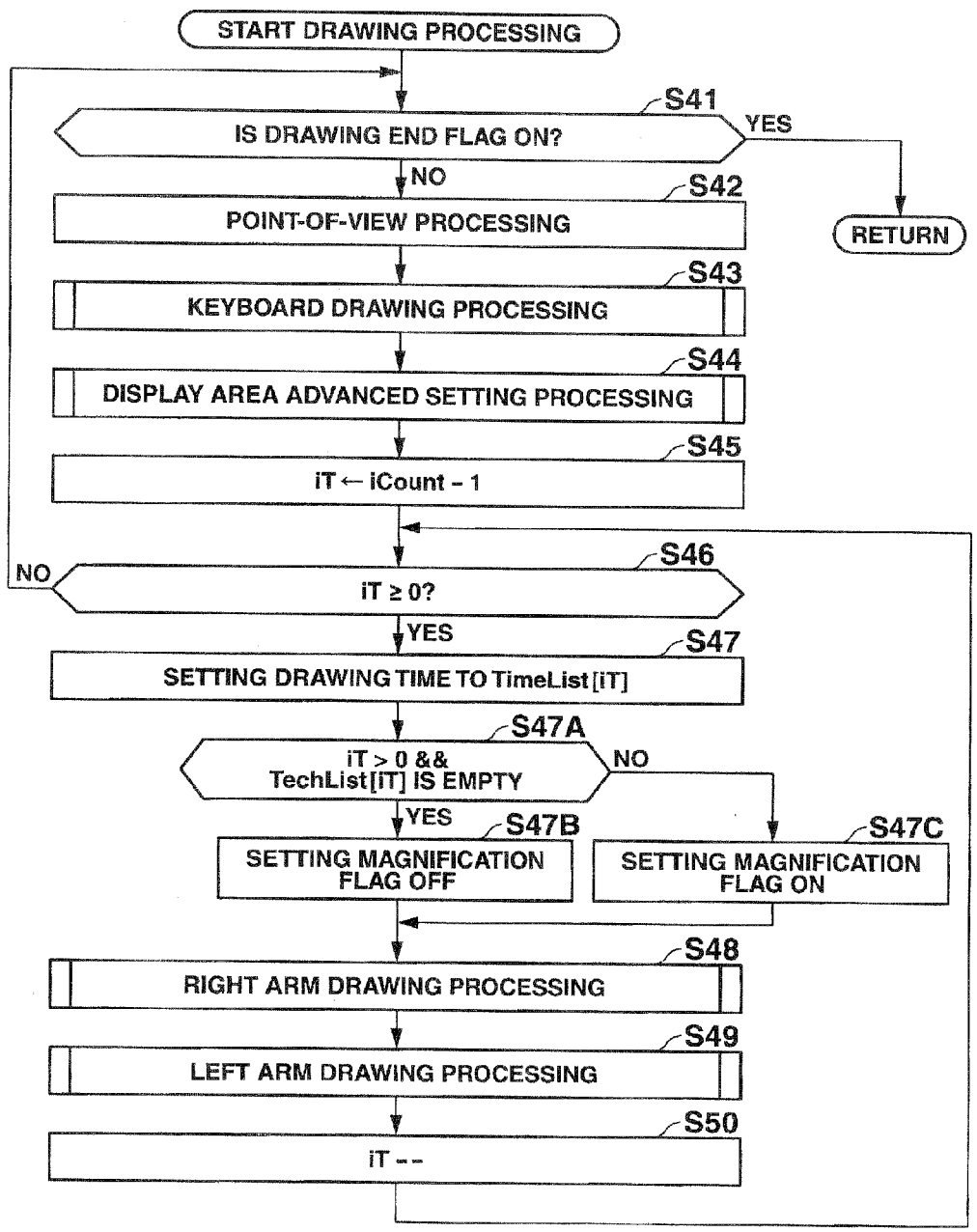
FIG. 24 is a flowchart showing a flow of drawing processing in the music playing movement display control device of the third embodiment.

FIG. 24 is a flowchart showing a flow of drawing processing in the music playing movement display control device of the third embodiment.

Since the processing of Step S41 to Step S47 is the same as the processing of Step S41 to Step S47 of the drawing processing of the first embodiment, explanations thereof are omitted.

In Step S47A, the CPU 11 determines whether iT is more than 0 and whether a technique list (TechList[iT]) is empty or not. In a case of a YES determination, the CPU 11 advances the processing to Step S47B, and in a case of a NO determination, the CPU 11 advances the processing to Step S47C.

In Step S47B, the CPU 11 sets an magnification flag to OFF.

In Step S47C, the CPU 11 sets the magnification flag to be ON.

Since the processing of Step S48 to Step S50 is the same as the processing of Step S48 to Step S50 of the drawing processing of the first embodiment, explanations thereof are omitted.

Figure 25:
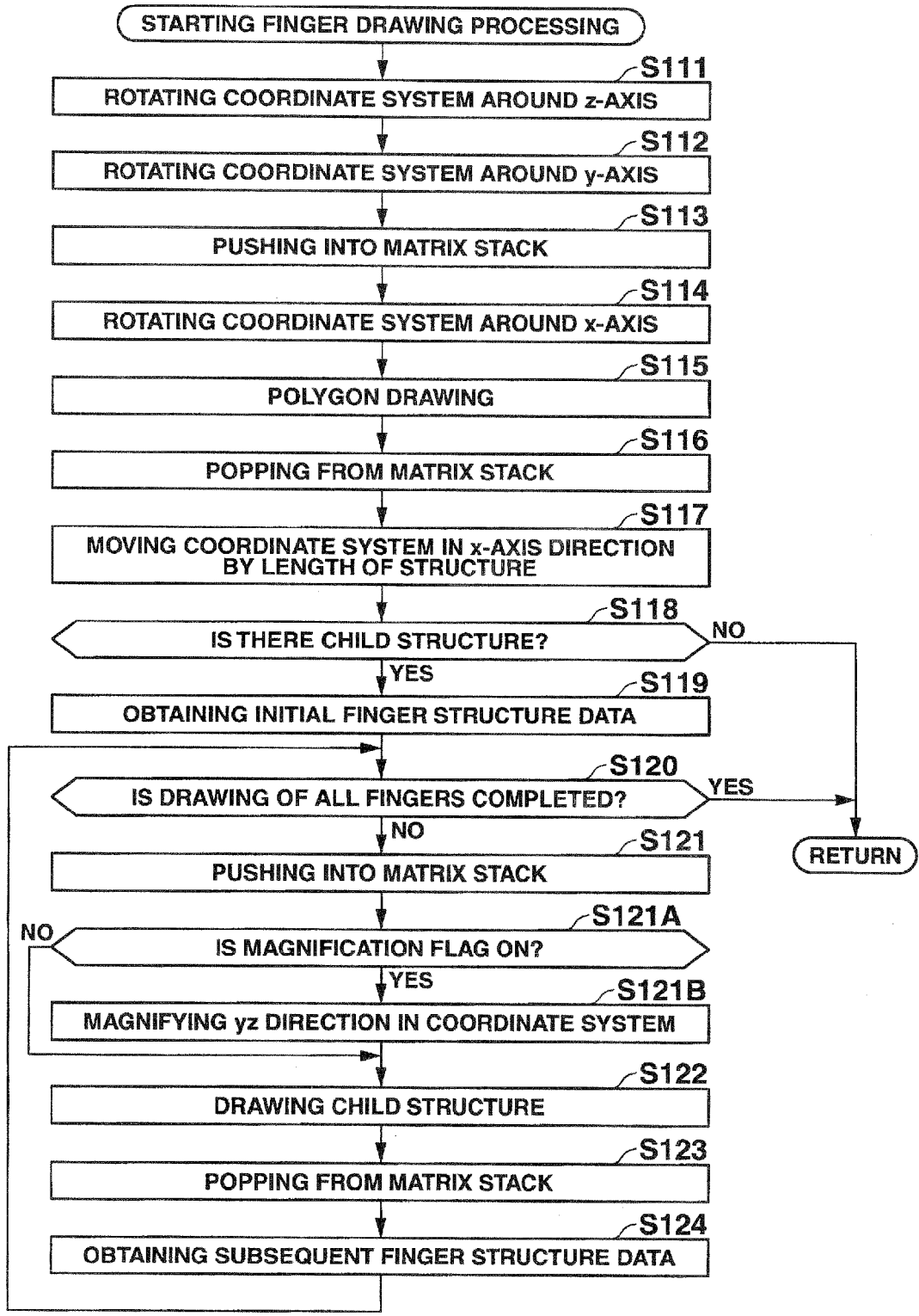
FIG. 25 is a flowchart showing a flow of finger drawing processing in the music playing movement display control device of the third embodiment.

FIG. 25 is a flowchart showing a flow of finger drawing processing in the music playing movement display control device of the third embodiment.

Since the processing of Step S111 to Step S121 is the same as the processing of Step S111 to Step S121 of the finger drawing processing of the first embodiment, explanations thereof are omitted.

In Step S121A, the CPU 11 determines whether iT is more than 0 and whether a technique list (TechList[iT]) is empty or not. In a case of a YES determination, the CPU 11 advances the processing to Step S121B, and in a case of a NO determination, the CPU 11 advances the processing to Step S122.

In Step S121A, the CPU 11 determines whether the magnification flag is ON. In a case of a YES determination, the CPU 11 advances the processing to Step S121B, and in a case of a NO determination, the CPU 11 advances the processing to Step S122.

In Step S121B, the CPU 11 magnifies an yz direction in the coordinate system. In this way, a music playing video is displayed to be magnified on the display unit 16.

As described above, in the third embodiment, in a case of drawing on a display means a movement image of fingers showing a pressed key position on a keyboard at a time in advance of respective times for each of times during a musical performance, the CPU 11 of the music playing movement display control device allows a movement image of fingers to be displayed to be magnified when the technique flag corresponding to the time in advance to the certain time is ON.

The music playing technique flag is set to be ON for a part for which music playing is difficult. Therefore, the music playing movement display control device of the third embodiment displays advanced movement information to be magnified for a part for which music playing is difficult; therefore, a player who needs practice of a part for which music playing is difficult can be allowed to play while the advanced movement information is being magnified.

Fourth Embodiment

A fourth embodiment is described hereafter.

A music playing movement display control device of the fourth embodiment includes the following features of: upon repeatedly playing back a certain musical performance, receiving a designated time as a time for starting the musical performance; specifying an end time of a movement to be repeatedly played back from the designated time, based on the music playing information; setting a section for which the musical performance is repeatedly played back based on the designated time and the end time thus specified; and for respective times during the section to be repeatedly played back, repeatedly drawing the movement image of fingers showing a pressed key position on a keyboard at the respective times.

For portions identical to the aforementioned embodiment, in the hardware configuration and the functional structure of the music playing video display device of the fourth embodiment, explanations thereof are omitted.

FIG. 26 is a diagram showing a structure of control variables. The control value is used for performing normal music playing movement display as well as magnified music playing movement display of the music playing movement display control device 1.

For the control variables, width, height, f0vy, Time, Status, center[3], Eye[3], EyeVector[3], NoteR[ ], StructR[ ], MotionR[ ], NoteL[ ], StructL[ ], and MotionL[ ] are defined as variables.

Thereamong, width, height, f0vy, NoteR[ ], StructR[ ], MotionR[ ], NoteL[ ], StructL[ ], and MotionL[ ] are identical to those in the abovementioned embodiments.

Time is a variable representing a drawing time.

Status is a variable representing a drawing status flag. This variable can be ant value among 0, 1, and 2. In a case of the value of this variable being 0, it represents a normal (emphasized) music playing status. In a case of the value of this variable being 1, it represents being within a section of a music playing loop during musical performance. In a case of the value of this variable being 2, it represents being outside of a section of a music playing loop during musical performance.

Center[3] is a variable representing the center coordinates of a field of view on the screen displayed on the display unit 16. Center[3] includes each coordinate value in a three dimensional coordinate system (x, y, z) for each element and represents a position in the three dimensional coordinate system.

Eye[3] is a variable representing a coordinate of a point of view on the screen displayed on the display unit 16. Eye[3] represents a position in the three dimensional coordinate system, similarly to Center[3].

EyeVector[3] is a variable representing a line-of-sight vector. EyeVector[3] is obtained by subtracting Center[3] from Eye[3].

Figure 27:
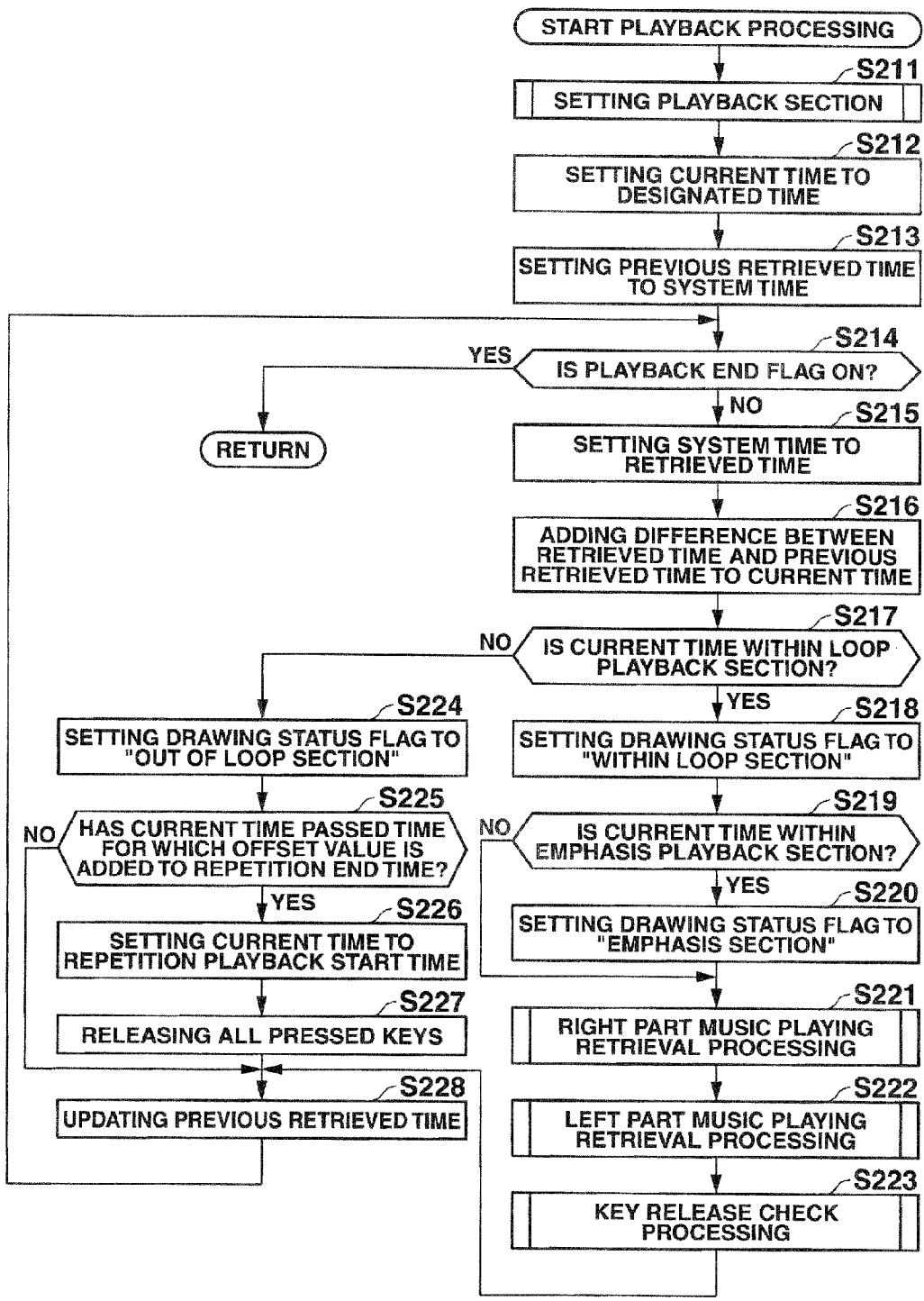
FIG. 27 is a flowchart showing a flow of play back processing in the music playing movement display control device of the fourth embodiment.

FIG. 27 is a flowchart showing a flow of play back processing.

In Step S211, the CPU 11 performs playback section setting processing. The details of the playback section setting processing are described in FIG. 28.

In Step S212, the CPU 11 sets a current time to a designated time. The designated time is obtained in the playback section setting processing.

In Step S213, the CPU 11 obtains a system time from a timer (not illustrated) and sets the system time to a previous retrieved time.

In Step S214, the CPU 11 determines whether a playback end flag stored in the RAM 13 is ON. In a case of the playback end flag being ON, the CPU 11 ends the playback processing. In a case of the playback end flag being OFF, the CPU 11 advances the processing to Step S215.

In Step S215, the CPU 11 obtains a system time from a timer (not illustrated) and sets the system time to a retrieved time.

In Step S216, the CPU 11 calculates an amount of time elapsed since the previous retrieved time by calculating the difference between the retrieved time and the previous retrieved time. The CPU 11 adds the difference thus calculated to a current time.

In Step S217, the CPU 11 determines whether the current time falls within a loop playback section. In a case of a YES determination, the CPU 11 advances the processing to Step S218, and in a case of a NO determination, the CPU 11 advances the processing to Step S224.

In Step S218, the CPU 11 sets the drawing status flag (Status) of the control variable to "1", which means that musical performance time is within a section of a loop.

In Step S219, the CPU 11 determines whether the music being played falls within an emphasized playback section or not. In a case of a YES determination, the CPU 11 advances the processing to Step S220, and in a case of a NO determination, the CPU 11 advances the processing to Step S21.

In Step S220, the CPU 11 sets the drawing status flag (Status) of the control variable to "0", which means that musical performance time is an emphasized section.

In Step S221, the CPU 11 performs right hand part music playing information retrieval processing, which is processing for retrieving music playing information of a right hand part. The details of the right hand part music playing information retrieval processing are described in detail with reference to FIG. 28.

In Step S222, the CPU 11 performs left hand part music playing information retrieval processing, which is processing for retrieving music playing information of a left hand part.

The details of the left hand part music playing information retrieval processing are described in detail with reference to FIG. 28.

In Step S223, the CPU 11 performs key release check processing. The details of key releasing check processing were described in detail with reference to FIG. 13. When the processing of Step S219 ends, the CPU 11 advances the processing to Step S228.

In Step S224, the CPU 11 sets the drawing status flag (Status) of the control variable to "2", which means that the musical performance time is outside of the section of a loop.

In Step S225, the CPU 11 determines whether the current time has passed a time arrived at by adding an offset value to a repetition end time. In a case of a YES determination, the CPU 11 advances the processing to Step S226, and in a case of a NO determination, the CPU 11 advances the processing to Step S228.

In Step S226, the CPU 11 sets the current time to a repetition playback start time. In this way, in a case of having passed the repetition start time, a playback start time is re-set to the current time.

In Step S227, the CPU 11 performs releasing of all of the keys of the keyboard.

In Step S228, the CPU 11 obtains a system time from a timer (not illustrated) and sets a system time to a previous retrieved time. When the processing ends, the CPU 11 advances the processing to Step S214.

Figure 28:
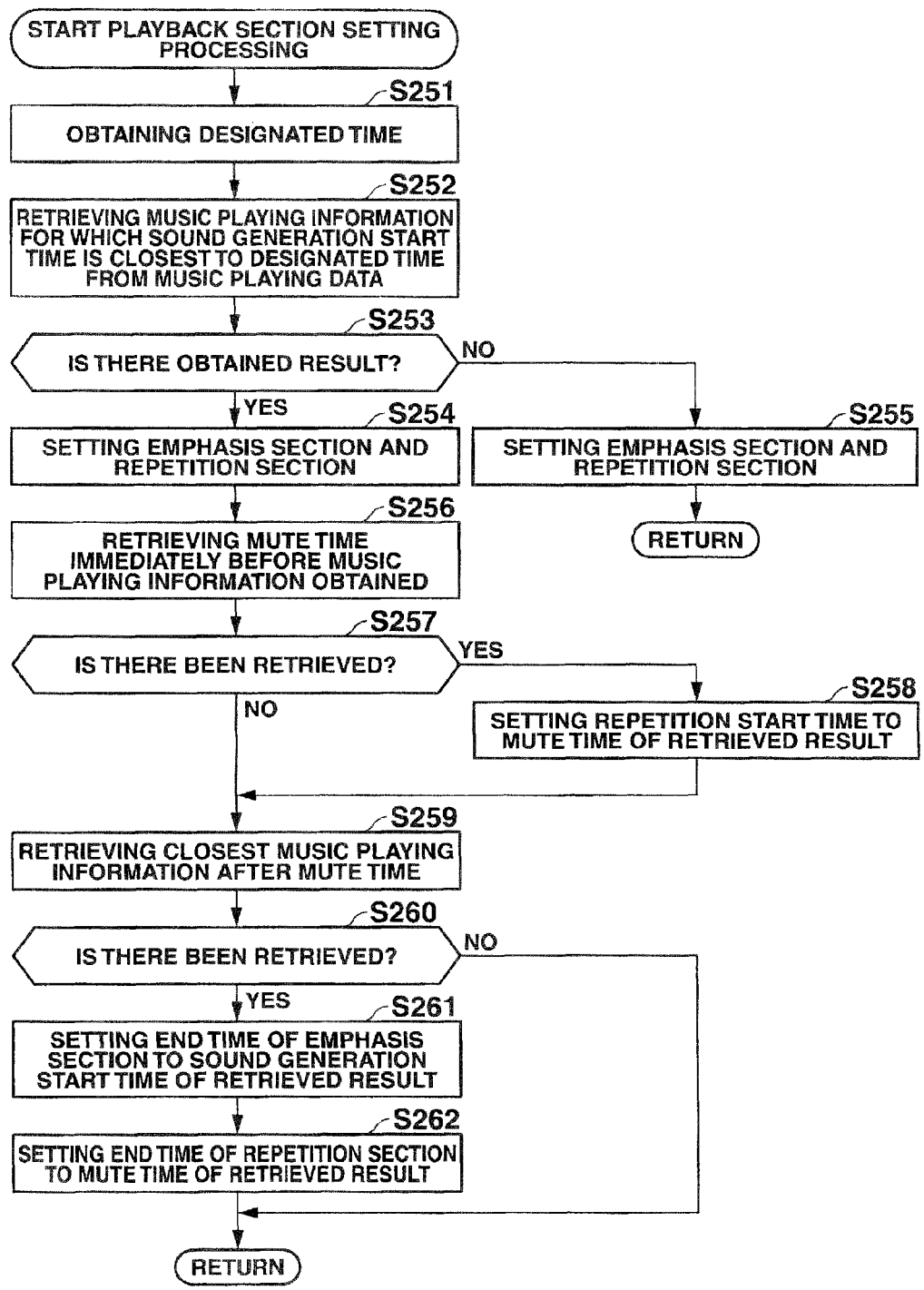
FIG. 28 is a flowchart showing a flow of playback section setting processing in the music playing movement display control device of the fourth embodiment.

FIG. 28 is a flowchart showing a flow of playback section setting processing.

In Step S251, the CPU 11 obtains a designated time by receiving a designation of a time for playing back a musical performance from the input unit 15.

In Step S252, the CPU 11 retrieves, from the music playing data, music playing information (Note[ ]) for which a sound generation start time is closest to a designated time.

In Step S253, the CPU 11 determines whether it could obtain the music playing information in Step S252. In a case of a YES determination, the CPU 11 advances the processing to Step S254, and in a case of a NO determination, the CPU 11 advances the processing to Step S255.

In Step S254, the CPU 11 sets an emphasis section and a repetition section. More specifically, the CPU 11 defines the emphasis section so as to be a section during which a mute time obtained by adding the sound generation continuation time (Gate) to the sound generation start time (Time) of the music playing information (Note[ ]) obtained in Step S252 is allowed to lapse until a predetermined amount of time (repetition time). Furthermore, the CPU 11 sets the repetition section and the emphasis section as the same section.

In Step S255, the CPU 11 sets an emphasis section and a repetition section. More specifically, the CPU 11 sets the emphasis section as a time from the designated time obtained at Step S251 to a time at which this designated time is allowed to lapse until a predetermined amount in time (a repetition time). Furthermore, the CPU 11 sets the repetition section and the emphasis section as the same section.

In Step S256, the CPU 11 specifies the music playing information immediately before the sound generation start time (Time) of the music playing information retrieved in Step S252, and retrieves the mute time based on the sound generation start time included in the music playing information thus specified and the sound generation continuation time.

In Step S257, the CPU 11 determines whether there is a retrieved result of the mute time in Step S256. In a case of a YES determination, the CPU 11 advances the processing to Step S258, and in a case of a NO determination, the CPU 11 advances the processing to Step S259.

In Step S258, the CPU 11 sets the repetition start time to a mute time of the retrieved result.

In Step S259, the CPU 11 retrieves music playing information (Note[ ]) for which the sound generation start time (Time) after the mute time is the closest to the mute time.

In Step S260, the CPU 11 determines whether there is a retrieved result of Step S259. In a case of a YES determination, the CPU 11 advances the processing to Step S261, and in a case of a NO determination, the CPU 11 ends the playback section setting processing.

In Step S261, the CPU 11 sets an end time of the emphasis section to the sound generation start time (Time) of the retrieved result in Step S259.

In Step S261, the CPU 11 sets an end time of the repetition section to the mute time obtained by adding the sound generation continuation time (Gate) to the sound generation start time (Time) of the retrieved result in the Step S259.

Figure 29:
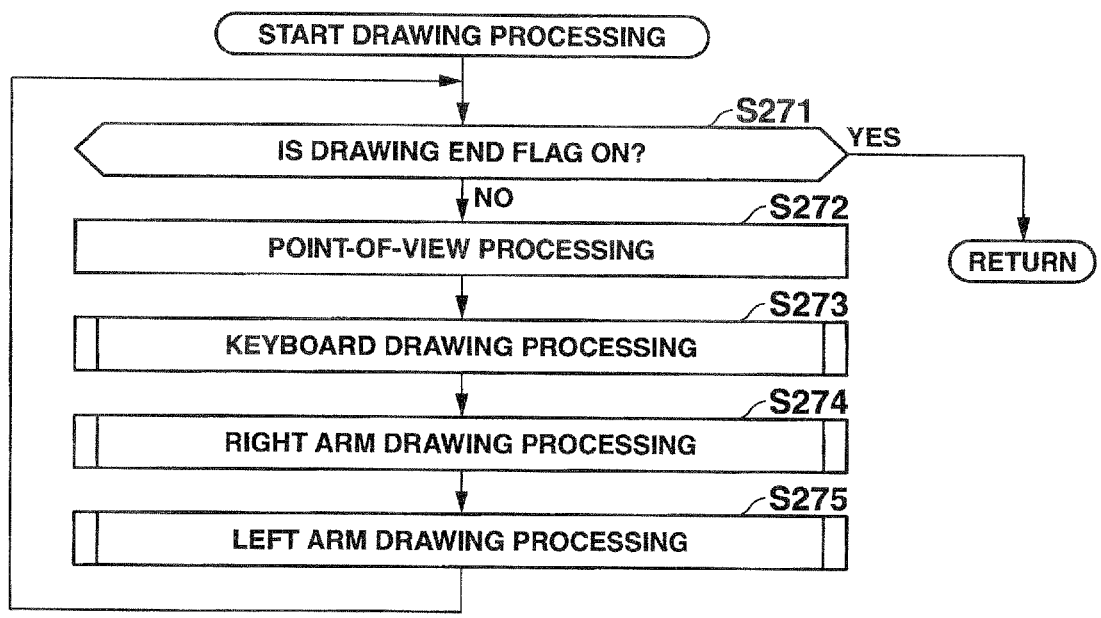
FIG. 29 is a flowchart showing a flow of drawing processing in the music playing movement display control device of the fourth embodiment.

FIG. 29 is a flowchart showing a flow of drawing processing.

In Step S271, the CPU 11 determines whether a drawing end flag is ON. In a case of a YES determination, the CPU 11 ends the drawing processing, and in a case of a NO determination, the CPU 11 advances the processing to Step S272.

In Step S272, the CPU 11 performs point-of-view setting processing. In addition, the CPU 11 can perform interruption processing in response to receiving a predetermined operation by way of the input unit 15, and can perform point-of-view setting processing during playback of a musical performance. In this way, it is possible for the music playing movement display control device 1 to change a point-of-view during playback of a musical performance.

That is to say, the CPU 11 sets a point of view on a screen displayed on the display unit 16 based on a height-direction view angle (f0vy) stored in a control variable (handCtrl) stored in the RAM 13, a center coordinate of a view (Center [3]), and a point of view (Eye[3]). In Step S273, the CPU 11 performs keyboard drawing processing. The details of keyboard drawing processing are described in detail with reference to FIG. 15.

In Step S274, the CPU 11 performs right arm drawing processing. The details of right arm drawing processing are described in detail with reference to FIG. 16.

In Step S275, the CPU 11 performs left arm drawing processing. The details of left arm drawing processing are described in detail with reference to FIG. 16. When this processing ends, the CPU 11 advances the processing to Step S271.

Figure 30:
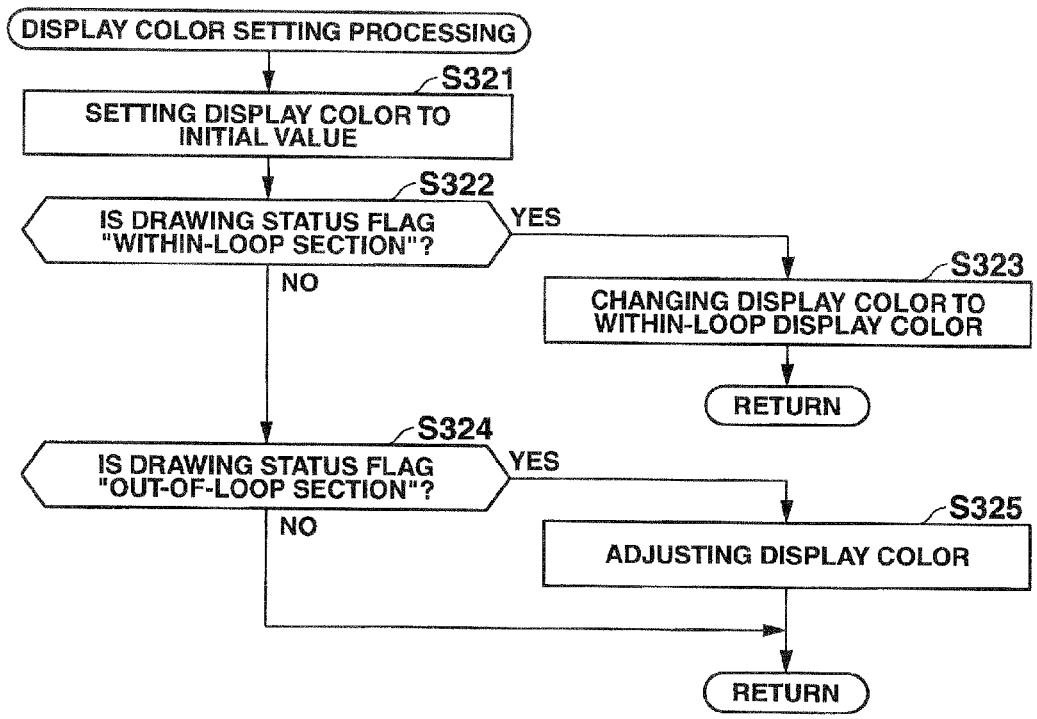
FIG. 30 is a flowchart showing a flow of display color setting processing in the music playing movement display control device of the fourth embodiment.

FIG. 30 is a flowchart showing a flow of display color setting processing.

In Step S321, the CPU 11 sets a value of a display color of fingers to an initial value. For example, the initial value is a value corresponding to skin color.

In Step S322, the CPU 11 determines whether a drawing status flag is "1: within loop section". In a case of a YES determination, the CPU 11 advances the processing to Step S323, and in a case of a NO determination, the CPU 11 advances the processing to Step S324.

In Step S323, the CPU 11 changes the display color to a within-loop display color. The within-loop display color is fixed beforehand and stored in the ROM 12. With this processing, a music playing movement within the loop section is highlighted. When the processing ends, the CPU 11 ends the display color setting processing.

In Step S324, the CPU 11 determines whether a drawing status flag is "2: outside loop section". In a case of a YES determination, the CPU 11 advances the processing to Step S325, and in a case of a NO determination, the CPU 11 ends the display color setting processing.

In Step S325, the CPU 11 changes a value of a display color to a value of a light color relative to the initial value. For example, the CPU 11 changes a display color in accordance with the formula (2) shown below.

$$\text{Value of Display Color} = \text{Value of within-Loop Display Color} + (\text{Value of Out-of-Loop Display Color} - \text{Value of within-Loop Display Color}) * [\text{Offset Ratio} + \text{Difference between Current Time and Loop Time Interval/Offset Time}] \quad (2)$$

Fifth Embodiment

A fifth embodiment is described hereafter.

The music playing movement display control device of the second embodiment is different from that of the fourth embodiment, and sets a mute time of a repetition section based on a music playing technique flag.

Since the hardware configuration and the functional configuration of the music playing video display control device of the fifth embodiment are similar to those of the first embodiment and are as shown in FIG. 1, explanations thereof are omitted here.

Hereinafter, playback section setting processing and display color setting processing performed by the music playing movement display control device of the fifth embodiment are explained with reference to FIGS. 31 to 33.

Figure 31:
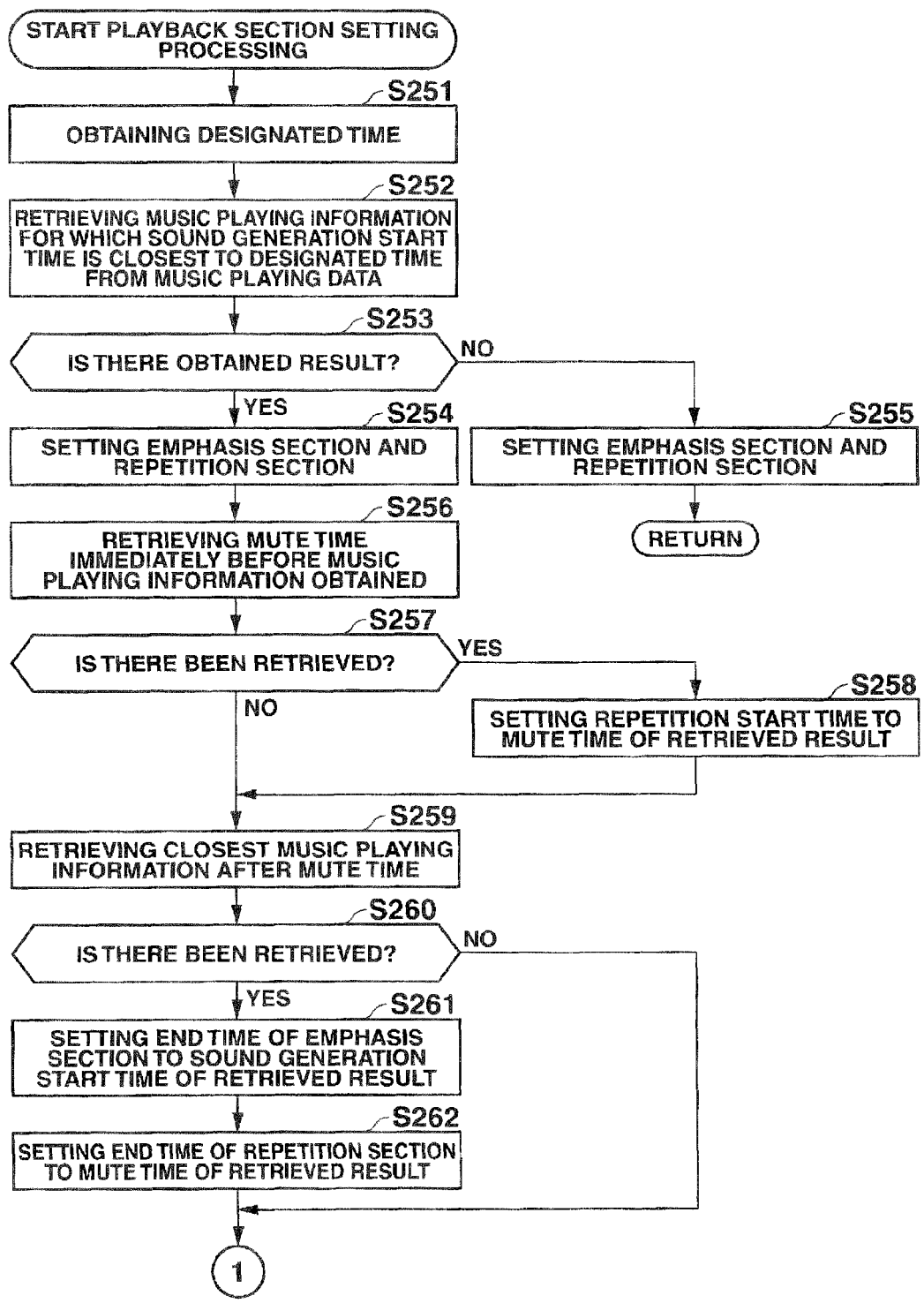
FIG. 31 is a flowchart showing a flow of playback section setting processing in the music playing movement display control device of the fifth embodiment.
Figure 32:
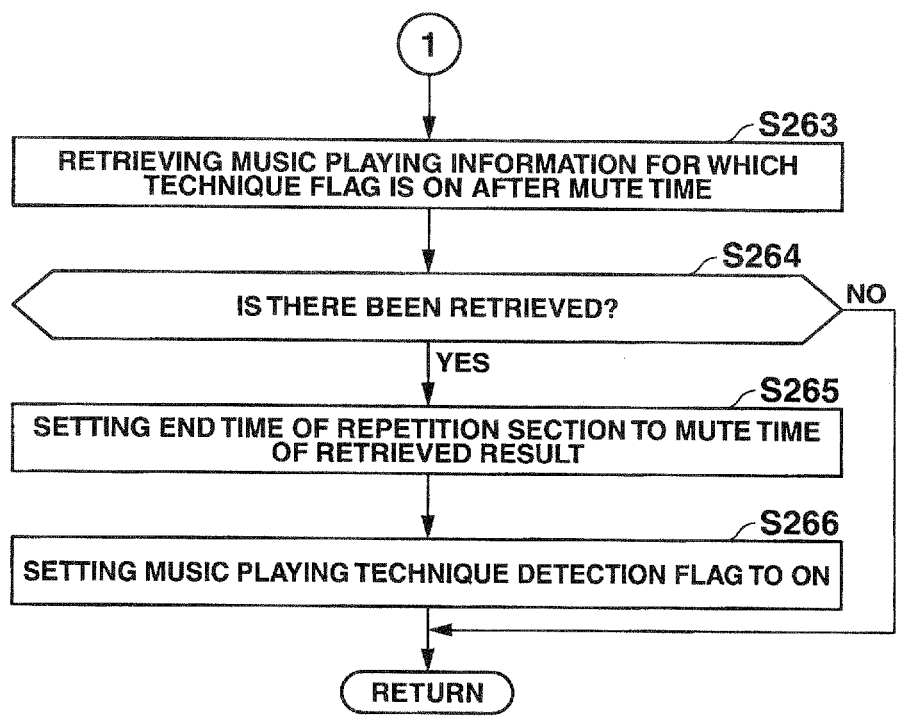
FIG. 32 is a flowchart continuing from FIG. 31.

FIGS. 31 and 32 are flowcharts showing the flow of the playback section setting processing at the music playing movement display control device of the fifth embodiment.

The processing from Step S251 to Step S262 is the same as that from Step S251 to Step S262 in the playback section setting processing of the fourth embodiment, and thus explanations thereof are omitted.

With reference to FIG. 32, in Step S263, the CPU 11 retrieves music playing information for which a technique flag is ON within a predetermined offset range after a mute time.

In Step S264, the CPU 11 determines whether there is a retrieved result of the music playing information in Step S263. In a case of a YES determination, the CPU 11 advances the processing to Step S265, and in a case of a NO determination, the CPU 11 ends the playback section setting processing.

In Step S265, the CPU 11 sets an end time of a repetition section to a mute time obtained by adding a sound continuation time (Gate) to a sound generation start time (Time) of the music playing information thus retrieved.

Furthermore, the music playing movement display control device of the fifth embodiment may be configured to receive a setting of whether to change a mute time based on a technique flag being ON or OFF, and to determine a setting method of the mute time based on this setting information.

In Step S266, the CPU 11 sets a music playing technique detection flag to ON. It should be noted that the music playing technique detection flag is read in the RAM 13 in advance and set to OFF, in the initialization processing of Step S1 in the main processing.

Figure 33:
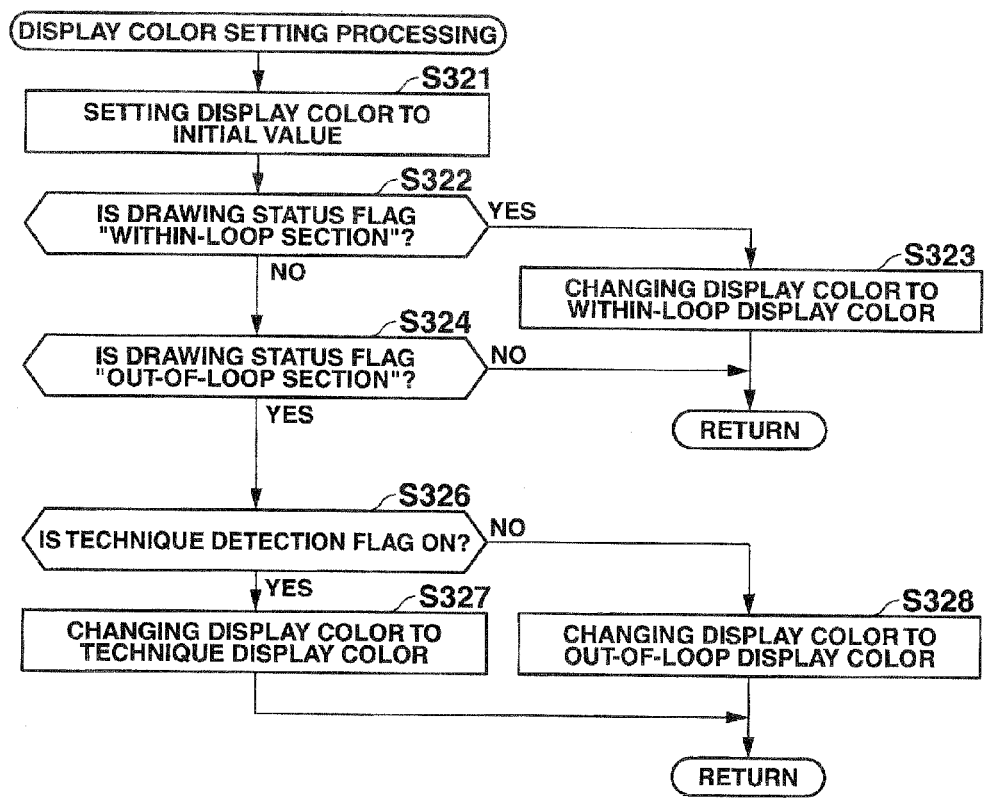
FIG. 33 is a flowchart showing a flow of display color setting processing in the music playing movement display control device of the fifth embodiment.

FIG. 33 is a flowchart showing a flow of display color setting processing of the music playing movement display control device of the fifth embodiment.

The processing from Step S321 to Step S323 is the same as that from Step S321 to Step S323 of the display color setting processing of the fourth embodiment, and thus explanations thereof are omitted.

In Step S324, the CPU 11 determines whether a drawing status flag is "2: out of loop section". In a case of a YES determination, the CPU 11 advances the processing to Step S326, and in a case of a NO determination, the CPU 11 ends the display color setting processing.

In Step S326, the CPU 11 determines whether the technique detection flag stored in the RAM 13 is ON. In a case of a YES determination, the CPU 11 advances the processing to Step S327, and in a case of a NO determination, the CPU 11 advances the processing to Step S328.

In Step S327, the CPU 11 changes a value of the display color to that of a technique display color. For example, the CPU 11 changes a display color in accordance with the formula (3) shown below.

Value of Display Color=Value of within-Loop Display Color+(Value of Technique Display Color−Value of within-Loop Display Color)*{Offset Ratio+ Difference between Current Time and Technique Sound Generation Time/Offset Time}  (3)

In Step S328, the CPU 11 changes a value of a display color to a value of a light color relative to the initial value. For example, the CPU 11 changes a display color in accordance with the formula (4) shown below.

Value of Display Color=Value of within-Loop Display Color+(Value of Out-of-Loop Display Color− Value of within-Loop Display Color)*{Offset Ratio+Difference between Current Time and Loop Time Interval/Offset Time}  (3)

As described above, in the fifth embodiment, the music playing movement display control device extends a mute time of a repetition section if there is music playing information for which a technique flag is ON within a predetermined offset range after the mute time of the repetition section. In this way, since the musical performance for which the technique flag is ON due to the passage of music being difficult around a designated time designated by a user is set as a target for a repetitive playback, it becomes possible for the player to simultaneously confirm the passage for which music playing is difficult.

In addition, although the music playing movement display control device to which the present invention is applied has been explained with the music playing movement control display device 1 as an example in the aforementioned embodiment, it is not particularly limited thereto.

For example, the present invention can be applied to general-purpose electronic equipment having a keyboard as well as a music playing movement display function. More specifically, the present invention is applicable to an electronic piano, an electronic organ, and the like, for example.

The aforementioned sequence of processing can be made to be executed by hardware, or can be made to be executed by software. In other words, the configuration of FIG. 1 is simply one example, and the present invention is not limited thereto.

That is to say, it is sufficient so long as the music playing movement display control device 1 includes a function that can entirely execute the aforementioned sequence of processing, and thus a configuration for achieving such a function is not limited to the example of FIG. 1.

In the case of having the sequence of processing executed by way of software, a program constituting this software is installed from the Internet or a recording medium (computer readable medium) into a computer or the like.

This computer may be a computer incorporating special-purpose hardware. Alternatively, the computer may be a computer capable of executing various functions by installing various programs.

It should be noted that the steps describing the program recorded in the recording medium naturally include processing performed chronologically in the described order, but is not necessarily processed chronologically, and also includes processing executed in parallel or separately.

Furthermore, in the specification of the present application, the term system shall refer to the meanings including an entire apparatus configured by a plurality of devices, means, and the like.

Although several embodiments of the present invention have been explained in the foregoing, these embodiments are merely exemplifications, and are not to limit the technical scope of the present invention. The present invention can adopt various other embodiments, and further, various modifications such as omissions and substitutions can be made thereto within a scope that does not deviate from the gist of the present invention. These embodiments and modifications thereof are included in the scope of and gist of the invention described in the present disclosure, and are included in the invention described in the accompanying claims and the scope of equivalents thereof.

What is claimed is:

1. A music playing movement display control device comprising:
   a storage unit that stores (i) music playing information including data indicating a sound generation start time, a sound generation continuation time, a pitch, and fingers to be used for a musical performance, (ii) keyboard data storing a pressed key status of a keyboard based on the music playing information, (iii) structure data indicating a structure of fingers, and (iv) movement information for displaying the structure data corresponding to the sound generation start time; and
   a drawing unit that, based on the music playing information, the keyboard data, the structure data, and the movement information stored in the storage unit, draws on a display a movement image of the fingers indicating a pressed key position on the keyboard at respective times during the musical performance.

2. The music playing movement display control device according to claim 1, further comprising:
   a list creator that creates a time list including the respective times and a time after the respective times for each of the respective times during the musical performance, based on the music playing information;
   wherein the drawing unit draws, on the display, the movement image of the fingers indicating the pressed key position on the keyboard at the respective times and a movement image of the fingers showing a pressed key position on the keyboard at the time after the respective times during the musical performance, based on the music playing information, the movement information, the keyboard data, the structure data, and the time list created by the list creator.

3. The music playing movement display control device according to claim 2, wherein the drawing unit changes a display mode of the movement image of the fingers showing the pressed key position on the keyboard at the time after the respective times, with respect to the movement image of the fingers showing the pressed key position on the keyboard at the respective times during the musical performance.

4. The music playing movement display control device according to claim 2, wherein:
   the music playing information includes a technique flag indicating a level of difficulty of music playing; and
   in a case of drawing, on the display, the movement image of the fingers showing the pressed key position on the keyboard at the time after the respective times during the musical performance, the drawing unit causes the movement image of the fingers to be displayed to be emphasized when the technique flag corresponding to the time after the respective times is ON.

5. The music playing movement display control device according to claim 1, further comprising:
   a receiver that receives a designated time as a time for starting a repetition section of the musical performance to be repeatedly played back; and
   a setter that specifies an end time of the repetition section of the musical performance to be repeatedly played back from the designated time, based on the music playing information, and sets the repetition section to repeatedly play back based on the designated time and the end time thus specified,
   wherein, for respective times during the repetition section, the drawing unit repeatedly draws the movement image of the fingers showing the pressed key position on the keyboard at the respective times, based on the music playing information, the movement information, the keyboard data, and the structural data.

6. The music playing movement display control device according to claim 5, wherein the drawing unit changes a display mode of the movement image of the fingers in the repetition section, compared to a display mode of a movement image of fingers in a case of not repeatedly drawing the movement image of the fingers.

7. A music playing movement display method performed by a music playing movement display control device, the method comprising:
   reading, from a storage unit, (i) music playing information including data indicating a sound generation start time, a sound generation continuation time, a pitch, and fingers to be used for a musical performance, (ii) keyboard data storing a pressed key status of a keyboard based on the music playing information, (iii) structure data indicating a structure of fingers, and (iv) movement information for displaying the structure data corresponding to the sound generation start time; and
   drawing, on a display, a movement image of fingers indicating a pressed key position on a keyboard at respective times during a musical performance based on the music playing information, the keyboard data, the structure data, and the movement information read from the storage unit.

8. The method according to claim 7, further comprising:
   creating a time list including the respective times and a time after the respective times for each of the respective times during the musical performance, based on the music playing information; and
   drawing, on the display, the movement image of the fingers indicating the pressed key position on the keyboard at the respective times and a movement image of the fingers showing a pressed key position on the keyboard at the time after the respective times during the musical performance, based on the music playing information, the movement information, the keyboard data, the structure data, and the created time list.

9. The method according to claim 8, further comprising changing a display mode of the movement image of the fingers showing the pressed key position on the keyboard at the time after the respective times, with respect to the movement image of the fingers showing the pressed key position on the keyboard at the respective times during the musical performance.

10. The method according to claim 8, wherein the music playing information includes a technique flag indicating a level of difficulty of music playing, and wherein the method further comprises displaying the movement image of the fingers to be emphasized, in a case of drawing, on the display, the movement image of the fingers showing the pressed key position on the keyboard at the time after the respective times during the musical performance, when the technique flag corresponding to the time after the respective times is ON.

11. The method according to claim 7, further comprising:
    receiving a designated time as a time for starting a repetition section of the musical performance to be repeatedly played back;
    specifying an end time of the repetition section of the musical performance to be repeatedly played back from the designated time based on the music playing information, and setting the repetition section to repeatedly play back, based on the designated time and the specified end time; and
    repeatedly drawing, for respective times during the repetition section, the movement image of the fingers showing the pressed key position on the keyboard at the respective times, based on the music playing information, the movement information, the keyboard data, and the structural data.

12. The method according to claim 11, wherein a display mode of the movement image of the fingers in the repetition section is different from a display mode of a movement image of fingers in a case of not repeatedly drawing the movement image of the fingers.

13. A non-transitory computer readable storage medium encoded with a program for enabling a computer to execute functions comprising:
    reading, from a storage unit, (i) music playing information including data indicating a sound generation start time, a sound generation continuation time, a pitch, and fingers to be used for a musical performance, (ii) keyboard data storing a pressed key status of a keyboard based on the music playing information, (iii) structure data indicating a structure of fingers, and (iv) movement information for displaying the structure data corresponding to the sound generation start time; and
    drawing, on a display, a movement image of the fingers indicating a pressed key position on a keyboard at respective times during a musical performance, based on the music playing information, the keyboard data, the structure data, and the movement information read from the storage unit.

14. The non-transitory computer readable storage medium according to claim 13, wherein the program enables the computer to execute further functions comprising:
    creating a time list including the respective times and a time after the respective times for each of the respective times during the musical performance, based on the music playing information;
    wherein the drawing comprises drawing, on the display, the movement image of the fingers indicating the pressed key position on the keyboard at the respective times and a movement image of the fingers showing a pressed key position on the keyboard at the time after the respective times during the musical performance, based on the music playing information, the movement information, the keyboard data, the structure data, and the created time list.

15. The non-transitory computer readable storage medium according to claim 14, wherein the program enables the computer to execute further functions comprising:

changing a display mode of the movement image of the fingers showing the pressed key position on the keyboard at the time after the respective times, with respect to the movement image of the fingers showing the pressed key position on the keyboard at the respective times during the musical performance.

16. The non-transitory computer readable storage medium according to claim 14, wherein the music playing information includes a technique flag indicating a level of difficulty of music playing, and wherein the movement image of the fingers is displayed to be emphasized, in a case of drawing, on the display, the movement image of the fingers showing the pressed key position on the keyboard at the time after the respective times during the musical performance, when the technique flag corresponding to the time after the respective times is ON.

17. The non-transitory computer readable storage medium according to claim 13, wherein the program enables the computer to execute further functions comprising:

receiving a designated time as a time for starting a repetition section of the musical performance to be repeatedly played back; and specifying an end time of the repetition section of the musical performance to be repeatedly played back from the designated time, based on the music playing information, and setting the repetition section to repeatedly play back, based on the designated time and the specified end time, and wherein the drawing comprises repeatedly drawing, on the display, the movement image of the fingers showing the pressed key position on the keyboard at respective times during the repetition section, based on the music playing information, the movement information, the keyboard data, and the structural data.

18. The non-transitory computer readable storage medium according to claim 17, wherein a display mode of the movement image of the fingers in the repetition section is different from a display mode of a movement image of fingers in a case of not repeatedly drawing the movement image of the fingers.

* * * * *